US008488893B2

United States Patent
Itoh

(10) Patent No.: US 8,488,893 B2
(45) Date of Patent: Jul. 16, 2013

(54) IMAGE COMPRESSION APPARATUS AND IMAGE COMPRESSION METHOD

(75) Inventor: Naotsugu Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/292,968

(22) Filed: Nov. 9, 2011

(65) Prior Publication Data

US 2012/0121176 A1    May 17, 2012

(30) Foreign Application Priority Data

Nov. 16, 2010    (JP) .................................. 2010-256308

(51) Int. Cl.
G06K 9/36    (2006.01)
G06K 9/46    (2006.01)

(52) U.S. Cl.
USPC ............................. 382/240; 382/232; 382/244

(58) Field of Classification Search
USPC .......................................... 382/232, 240, 244
See application file for complete search history.

(56) References Cited

U.S. PATENT DOCUMENTS

| 8,031,958 | B2 * | 10/2011 | Saito et al. | 382/244 |
| 8,374,446 | B2 * | 2/2013 | Mokrushin | 382/240 |
| 2003/0081233 | A1 * | 5/2003 | Obrador | 358/1.13 |
| 2008/0175489 | A1 * | 7/2008 | Lee et al. | 382/232 |
| 2008/0205508 | A1 * | 8/2008 | Ziauddin et al. | 375/240.01 |

FOREIGN PATENT DOCUMENTS

JP    08-149282 A    6/1996

* cited by examiner

*Primary Examiner* — Li Liu

(74) *Attorney, Agent, or Firm* — Canon U.S.A., Inc. IP Division

(57) ABSTRACT

An image compression apparatus performs image compression on high-resolution image data of various resolutions while reducing the circuit size. A generation unit generates complementary information based on an arrangement pattern of pixel values in each of the divided blocks each including 2 by 2 pixels. Further, image data of $1/(2^M)$ times the resolution is compressed using a first compression method, and image data of $1/(2^N)$ times the resolution is compressed using a second compression method. The apparatus determines whether to cause a combination of the complementary information and first compressed data to be output, or a combination of the complementary information and second compressed data to be output, based on the data size of each.

12 Claims, 24 Drawing Sheets

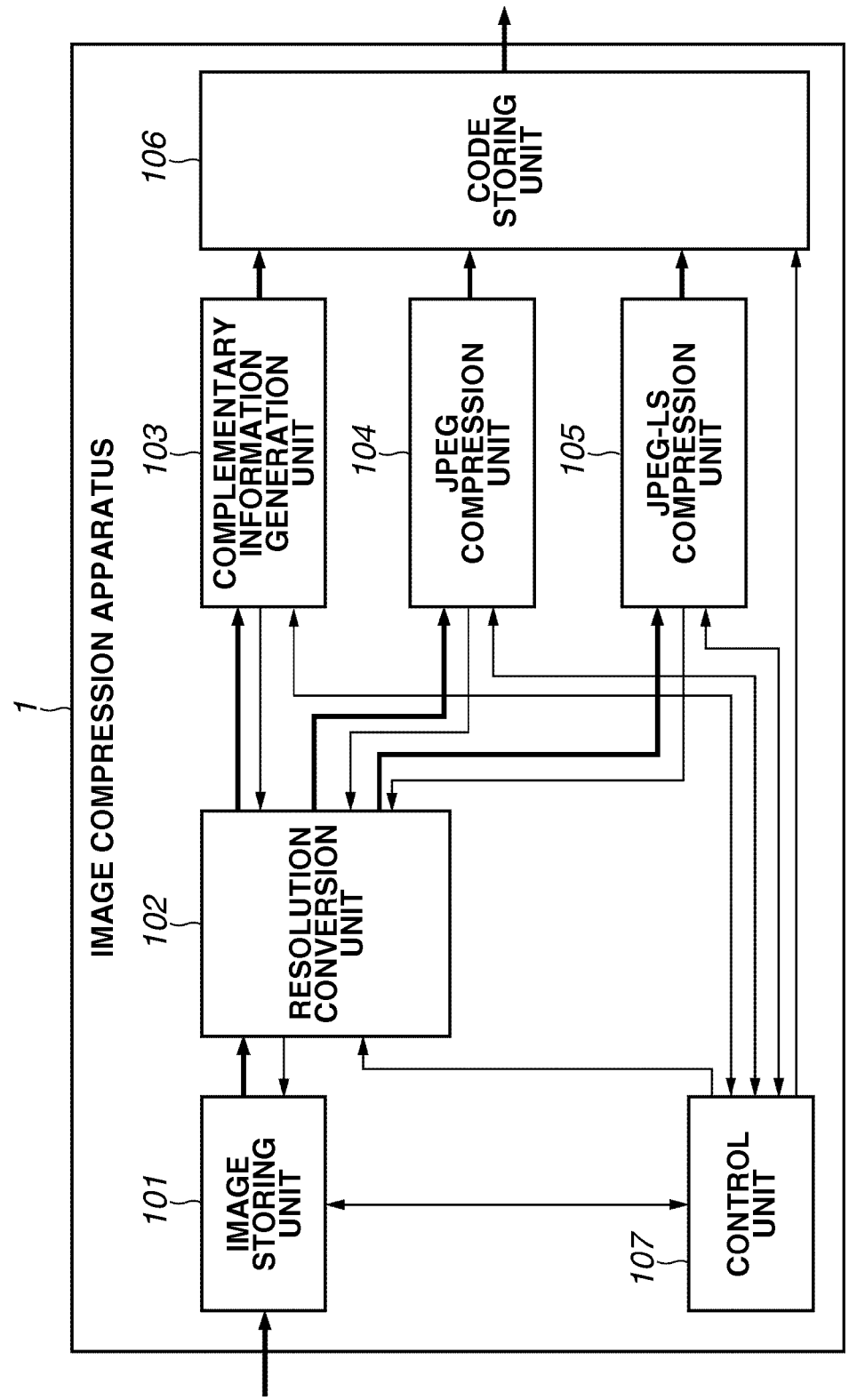

FIG.7

| 0 | 0 | 0 | 0 | 0 | 0 | 7 | 0 | 0 | 7 | 0 | 0 | 0 | 0 | 4 | 0 |
|---|---|---|---|---|---|---|---|---|---|---|---|---|---|---|---|
| 0 | 0 | 0 | 0 | 0 | 0 | 1 | 0 | 0 | 5 | 0 | 5 | 0 | 0 | 2 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 5 | 0 | 0 | 7 | 0 | 0 | 0 | 4 | 0 | 0 | 5 |
| 0 | 0 | 0 | 0 | 0 | 0 | 0 | 0 | 5 | 0 | 0 | 0 | 5 | 0 | 0 | 0 |
| 0 | 0 | 0 | 0 | 7 | 0 | 0 | 0 | 0 | 0 | 0 | 0 | 0 | 0 | 0 | 0 |
| 0 | 0 | 0 | 0 | 1 | 0 | 0 | 5 | 0 | 0 | 0 | 0 | 0 | 5 | 0 | 0 |
| 0 | 0 | 0 | 0 | 0 | 0 | 0 | 1 | 0 | 0 | 0 | 0 | 0 | 2 | 0 | 0 |
| 0 | 0 | 0 | 5 | 0 | 0 | 0 | 3 | 3 | 3 | 3 | 3 | 3 | 3 | 0 | 0 |
| 0 | 0 | 0 | 1 | 0 | 0 | 0 | 0 | 0 | 0 | 0 | 0 | 0 | 0 | 0 | 0 |
| 0 | 0 | 7 | 0 | 0 | 0 | 0 | 0 | 0 | 0 | 0 | 0 | 0 | 0 | 0 | 0 |
| 0 | 0 | 5 | 0 | 0 | 7 | 0 | 0 | 0 | 0 | 0 | 0 | 0 | 0 | 0 | 4 |
| 0 | 0 | 0 | 0 | 0 | 5 | 0 | 0 | 0 | 0 | 0 | 0 | 0 | 0 | 0 | 2 |
| 0 | 5 | 0 | 0 | 0 | 0 | 0 | 0 | 0 | 0 | 0 | 0 | 0 | 0 | 0 | 0 |
| 0 | 1 | 0 | 0 | 5 | 0 | 0 | 0 | 0 | 0 | 0 | 0 | 0 | 0 | 0 | 0 |
| 7 | 0 | 0 | 0 | 1 | 0 | 0 | 0 | 0 | 0 | 0 | 0 | 0 | 0 | 0 | 0 |

FIG.8

| 0 | 0 | 0 | 0 | 5 | 5 | 0 | 4 |
|---|---|---|---|---|---|---|---|
| 0 | 0 | 7 | 0 | 1 | 0 | 0 | 5 |
| 0 | 0 | 1 | 0 | 0 | 0 | 4 | 0 |
| 0 | 0 | 0 | 5 | 0 | 0 | 2 | 0 |
| 0 | 5 | 0 | 0 | 0 | 0 | 0 | 0 |
| 0 | 0 | 7 | 3 | 3 | 3 | 3 | 4 |
| 7 | 0 | 5 | 0 | 0 | 0 | 0 | 0 |
| 1 | 0 | 0 | 0 | 0 | 0 | 0 | 0 |

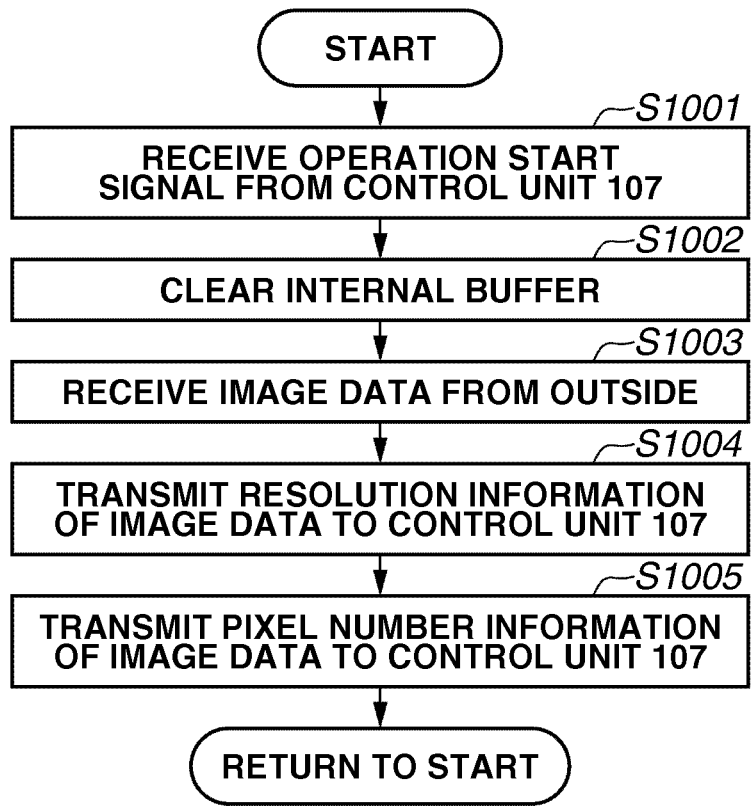
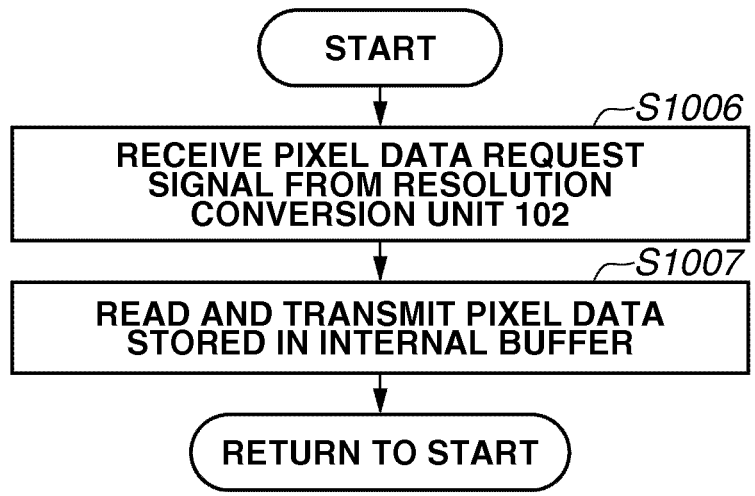

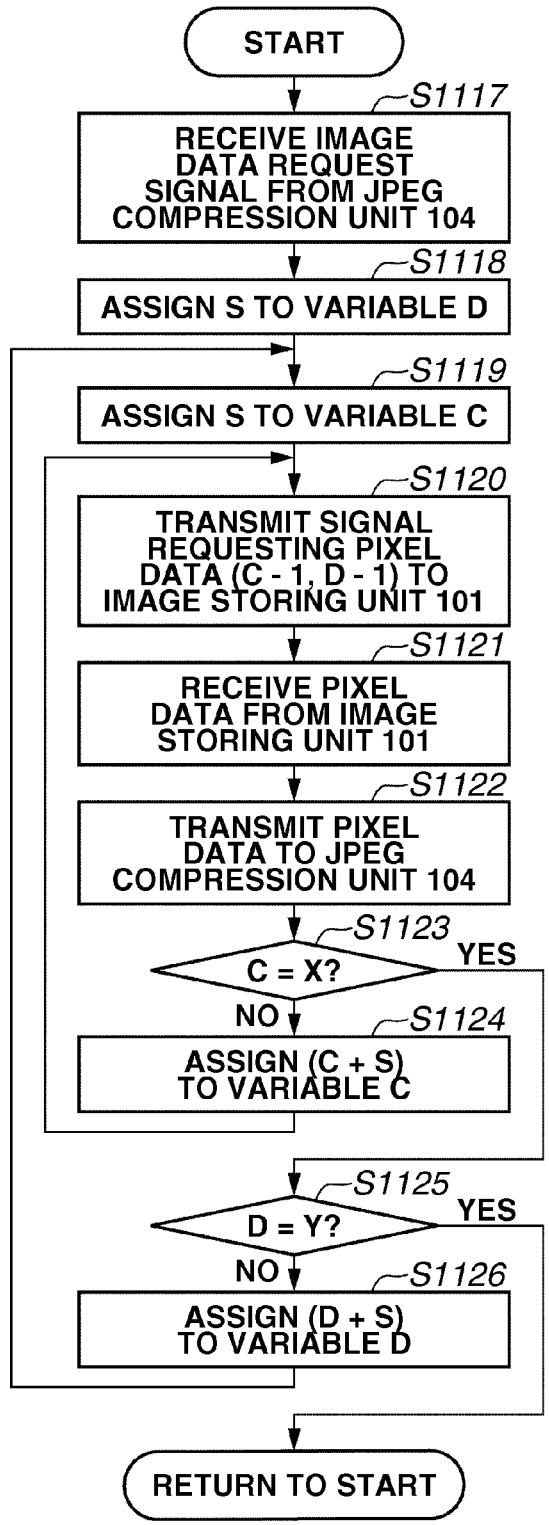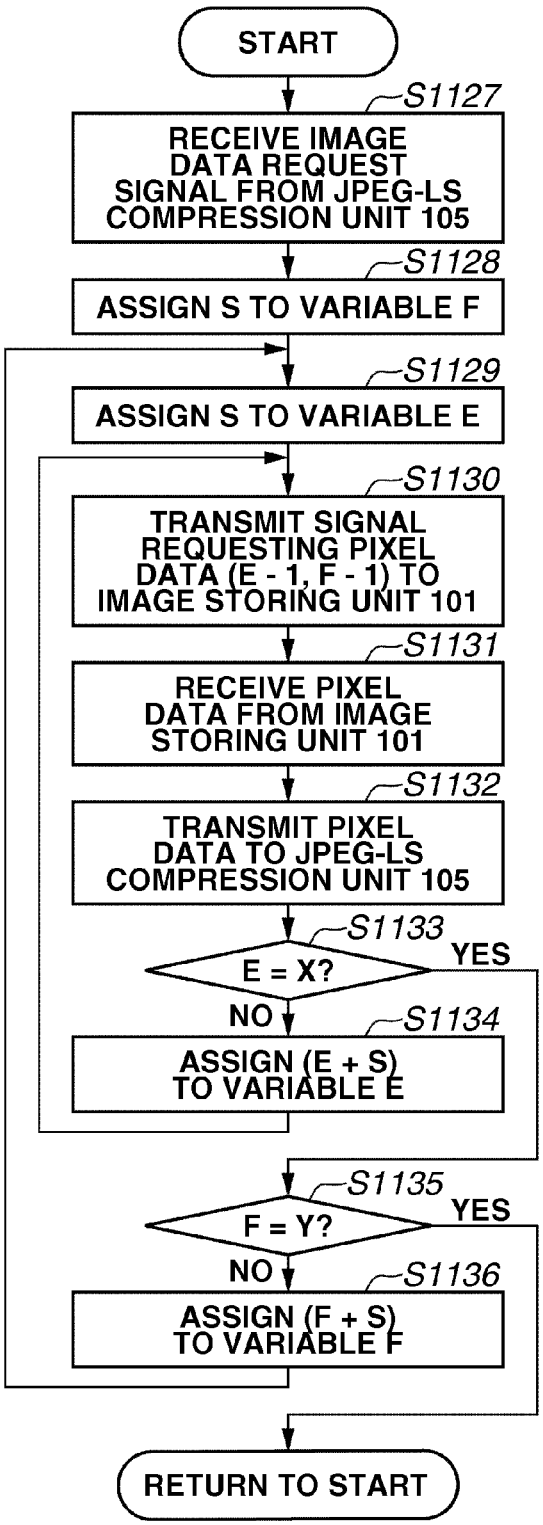

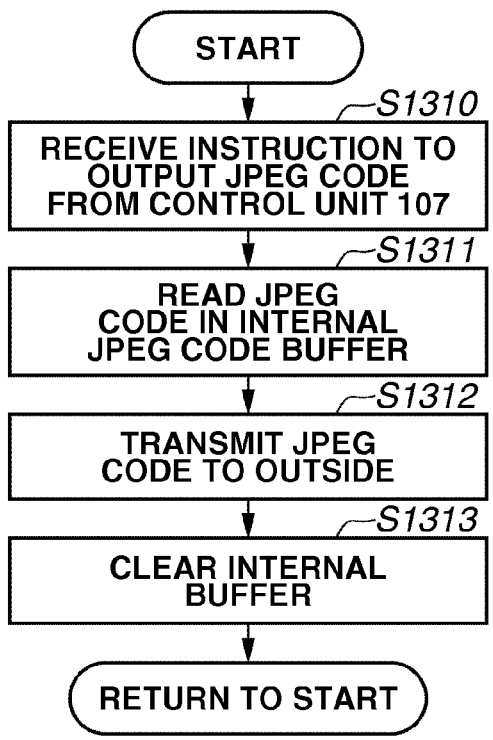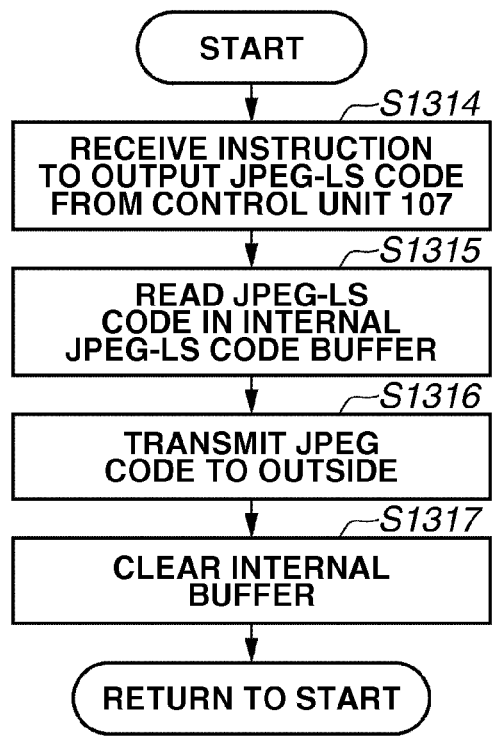

FIG.16

| 0 | 0 | 0 | 0 | 0 | 0 | 7 | 0 | 0 | 7 | 0 | 4 | 0 | 0 | 4 | 0 |
|---|---|---|---|---|---|---|---|---|---|---|---|---|---|---|---|
| 0 | 0 | 0 | 0 | 0 | 0 | 5 | 0 | 0 | 5 | 0 | 7 | 0 | 0 | 7 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 7 | 0 | 0 | 7 | 0 | 0 | 0 | 5 | 0 | 0 | 5 |
| 0 | 0 | 0 | 0 | 0 | 1 | 0 | 0 | 5 | 0 | 0 | 0 | 7 | 0 | 0 | 2 |
| 0 | 0 | 0 | 0 | 7 | 0 | 0 | 7 | 0 | 0 | 0 | 0 | 0 | 4 | 0 | 0 |
| 0 | 0 | 0 | 0 | 5 | 0 | 0 | 5 | 0 | 0 | 0 | 0 | 0 | 5 | 0 | 0 |
| 0 | 0 | 0 | 0 | 0 | 0 | 0 | 1 | 0 | 0 | 0 | 0 | 0 | 2 | 0 | 0 |
| 0 | 0 | 0 | 7 | 0 | 0 | 2 | 3 | 3 | 3 | 3 | 3 | 3 | 3 | 0 | 0 |
| 0 | 0 | 0 | 5 | 0 | 0 | 0 | 0 | 0 | 0 | 0 | 0 | 0 | 0 | 0 | 0 |
| 0 | 0 | 7 | 0 | 0 | 0 | 0 | 0 | 0 | 0 | 0 | 0 | 0 | 0 | 0 | 0 |
| 0 | 0 | 5 | 0 | 0 | 7 | 0 | 0 | 0 | 0 | 0 | 0 | 0 | 0 | 0 | 5 |
| 0 | 0 | 1 | 0 | 0 | 5 | 0 | 0 | 0 | 0 | 0 | 0 | 0 | 0 | 0 | 2 |
| 0 | 7 | 0 | 0 | 7 | 0 | 0 | 0 | 0 | 0 | 0 | 0 | 0 | 0 | 0 | 0 |
| 0 | 5 | 0 | 0 | 5 | 0 | 0 | 0 | 0 | 0 | 0 | 0 | 0 | 0 | 0 | 0 |
| 7 | 0 | 0 | 0 | 1 | 0 | 0 | 0 | 0 | 0 | 0 | 0 | 0 | 0 | 0 | 0 |

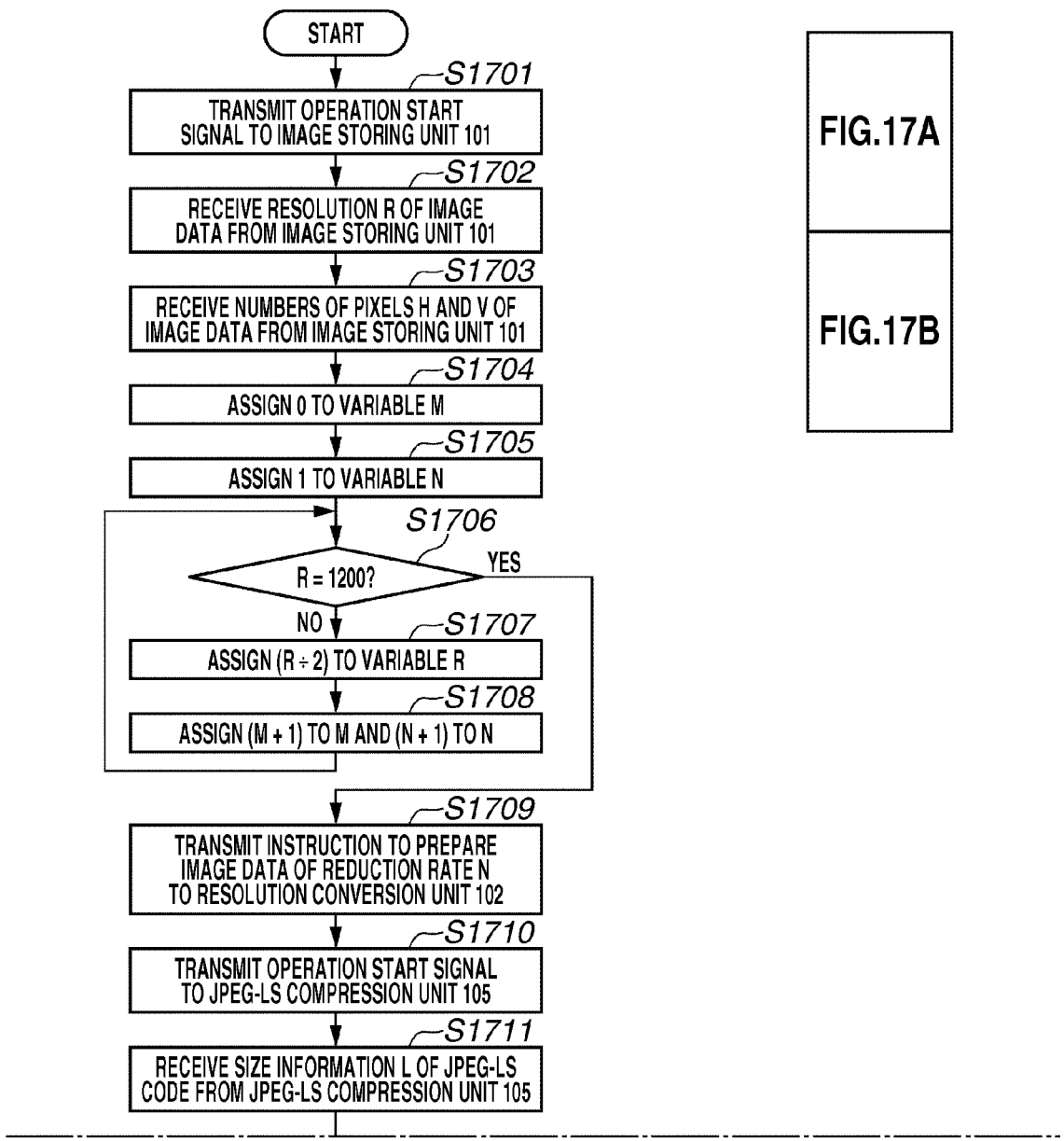

IMAGE COMPRESSION APPARATUS AND IMAGE COMPRESSION METHOD

BACKGROUND OF THE INVENTION

1. Field of the Invention

The present invention relates to an image compression apparatus which compresses image data.

2. Description of the Related Art

There is an apparatus such as a copying machine or a printer which handles document images, performs image compression on the document images using an image compression apparatus, and then stores or transfers the compressed document images.

Recently, technological improvements in a scanner apparatus or a printer apparatus that handles document images has led to a demand for the image compression apparatus included in an image processing apparatus connected to such an apparatus, to process image data of higher resolution. At the same time, there is a demand for such an image compression apparatus to continue processing image data of low resolution as previously. It is thus necessary for the image compression apparatus to support image data of various resolutions.

Further, a level of visual image quality deterioration caused by performing image compression is different depending on the resolution of the image data. To solve such a problem, Japanese Patent Application Laid-Open No. 08-149282 discusses an image compression apparatus that compresses the image data by determining a compression rate according to the resolution. As a result, the difference between the levels of image quality deterioration caused by performing image compression due to the differences in the resolution of the image data is decreased.

On the other hand, since the image compression apparatus is to process image data of high resolution in which there is a large number of pixels, a circuit size thereof becomes large. Cost of semiconductor manufacturing and power consumption thus increase in such an image compression apparatus.

SUMMARY OF THE INVENTION

According to an aspect of the present invention, An image compression apparatus includes an image storing unit configured to store first image data, a conversion unit configured to acquire, from the image storing unit, pixel data thinned out to be of a second resolution which is $1/(2^T)$ times a first resolution of the first image data (T=0, 1, 2, ... N), and output the acquired pixel data as second image data, a generation unit configured to divide the second image data into blocks of 2 by 2 pixels, and generate complementary information based on an arrangement pattern of pixel values in each of the divided blocks, wherein the complementary information enables restoration of the second image data by combining the complementary information with a third image whose third resolution is ½ times the second resolution of the second image data, and wherein the generation unit generates the complementary information with respect to each of the second image data whose second resolutions are $1/(2^T)$ times the first resolution (T=0, 1, 2, ... , N-1), a first compression unit configured to generate first compressed data by compressing, employing a first compression method, the second image data whose resolution is $1/(2^M)$ times the first resolution (M<N), a second compression unit configured to generate second compressed data by compressing, employing a second compression method, the second image data whose resolution is $1/(2^N)$ times the first resolution, a code storing unit configured to store the generated complementary information, the first compressed data, and the second compressed data, and a control unit configured to determine whether to cause the code storing unit to output a combination of the first compressed data and the complementary information generated with respect to each of the second image data whose second resolutions are $1/(2^T)$ times the first resolution (T=0, 1, 2, ... , M-1), or output a combination of the second compressed data and the complementary information generated with respect to each of the second image data whose second resolutions are $1/(2^T)$ times the first resolution (T=0, 1, 2, ... , N-1), based on at least one of a data size of the complementary information for each resolution, a data size of the first compressed data, and a data size of the second compressed data, and to control the code storing unit to output the combination determined to be output.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an image compression apparatus.

FIG. 7 is a schematic diagram illustrating complementary information generated by a complementary information generation unit 103 based on an input of image data illustrated in FIG. 2A.

FIG. 8 is a schematic diagram illustrating complementary information generated by the complementary information generation unit 103 based on an input of image data illustrated in FIG. 4A.

FIGS. 10A and 10B are flowcharts illustrating a processes performed by an image storing unit 101.

FIGS. 11A, 11B, 11C, and 11D are flowcharts illustrating processes performed by a resolution conversion unit 102.

FIGS. 13A, 13B, 13C, 13D, 13E, and 13F are flowcharts illustrating processes performed by a code storing unit 106.

FIG. 16 is a schematic diagram illustrating complementary information generated by the complementary information generation unit 103 based on an input of image data illustrated in FIG. 15 according to a third exemplary embodiment.

DESCRIPTION OF THE EMBODIMENTS

Figure 2A:
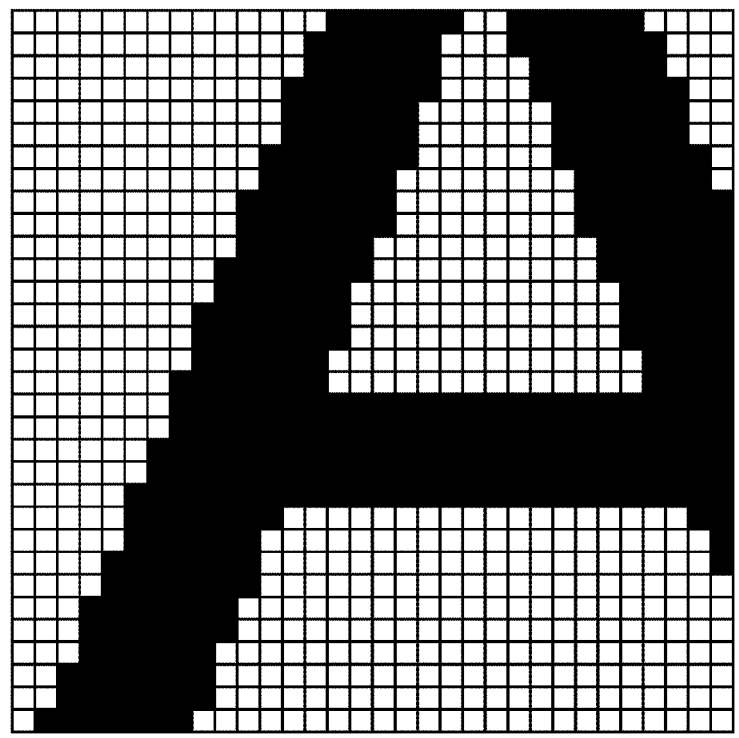
FIGS. 2A and 2B are schematic diagrams illustrating image data of 32 pixels in a vertical direction and 32 pixels in a horizontal direction having a resolution of 2400 dpi.

Various exemplary embodiments, features, and aspects of the invention will be described in detail below with reference to the drawings.

A first exemplary embodiment of the present invention will be described below with reference to the drawings. FIG. 1 is a block diagram illustrating an image compression apparatus. Referring to FIG. 1, a control unit 107 controls the processes performed by an image storing unit 101, a resolution conversion unit 102, a complementary information generation unit 103, a JPEG compression unit 104, and a JPEG-LS compression unit 105. The control unit 107 thus performs control to compress the image data input to an image compression apparatus 1.

According to the present exemplary embodiment, each unit illustrated in FIG. 1 is realized by an electronic circuit (hardware) such as an application specific integrated circuit (ASIC). However, this is not a limitation, and a portion thereof may be realized by a computer executing a program (software).

The image storing unit 101 internally stores image data input to the image compression apparatus 1, and transmits resolution information of the stored image data to the control unit 107. Further, the image storing unit 101 transfers to the resolution conversion unit 102 pixel data configuring the stored image data, in response to an instruction received from the resolution conversion unit 102.

The resolution conversion unit 102 generates from the original image data stored in the image storing unit 101 and outputs as necessary the image data whose resolution has been reduced (the resolution conversion unit 102 may also output the image data without performing resolution conversion).

The resolution conversion unit 102 outputs the image data in response to transfer request signals transmitted from the complementary information generation unit 103, the JPEG compression unit 104, and the JPEG-LS compression unit 105. In such a case, the resolution conversion unit 102 instructs and causes the image storing unit 101 to transfer the pixel data necessary for generating the image data of the desired resolution.

The complementary information generation unit 103 receives the image data transferred from the resolution conversion unit 102, and generates and outputs to the code storing unit 106 the complementary information. The complementary information is information used for restoring the image data to the image data of the original resolution by combining it with the resolution-converted image data. Further, the complementary information generation unit 103 transmits size information of the generated complementary information to the control unit 107.

The JPEG compression unit 104 receives and converts to a JPEG code the image data transferred from the resolution conversion unit 102, and outputs the JPEG code to the code storing unit 106. Further, the JPEG compression unit 104 transmits the size information of the generated JPEG code to the control unit 107. According to the present exemplary embodiment, the JPEG compression unit 104 executes lossy compression in performing JPEG coding.

The JPEG-LS compression unit 105 receives and converts to a JPEG-LS code the image data transferred from the resolution conversion unit 102, and outputs the JPEG-LS code to the code storing unit 106. Further, the JPEG-LS compression unit 105 transmits the size information of the generated JPEG-LS code to the control unit 107. According to the present exemplary embodiment, the JPEG-LS compression unit 105 executes lossless compression in performing JPEG-LS coding.

The code storing unit 106 receives and stores the complementary information transmitted from the complementary information generation unit 103, and the code data transmitted from the JPEG compression unit 104 and the JPEG-LS compression unit 105. Further, the code storing unit 106 outputs all or a portion of the stored complementary information and code data to outside, according to an instruction received from the control unit 107.

Figure 2B:
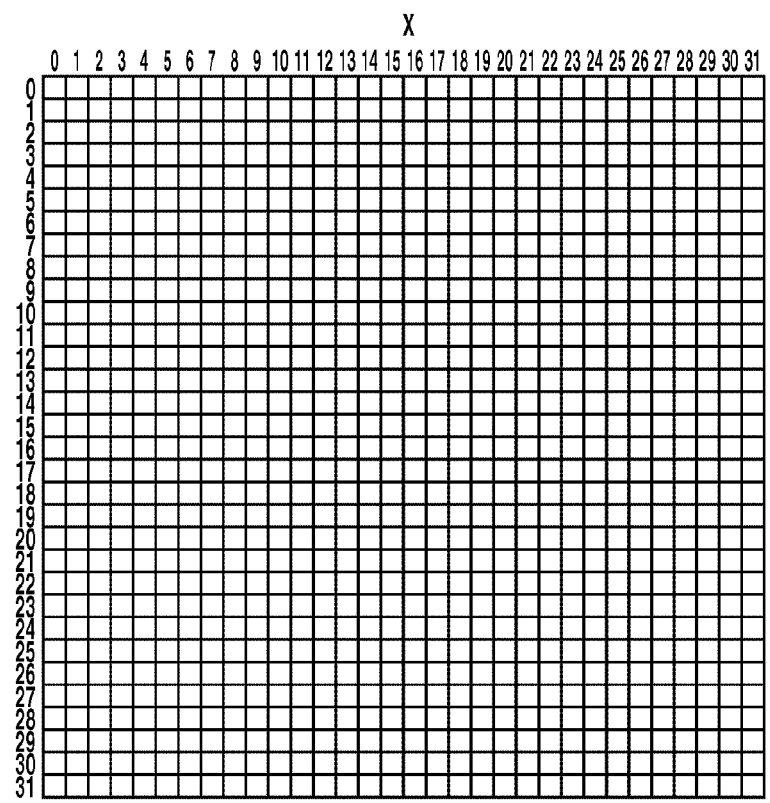

FIGS. 2A and 2B are examples of schematic diagrams of image data of 32 pixels in the vertical direction and 32 pixels in the horizontal direction having a resolution of 2400 dpi. Each cell indicates a pixel, and each pixel includes 24-bit color information. FIG. 2A illustrates an example of an image in which a value of each pixel is either black or white, and in which a white pixel has a value FFFFFFh, and a black pixel has a value 000000h. FIG. 2B illustrates coordinates of each pixel, and the coordinates are assigned to each pixel using coordinate values in which X-coordinate of leftmost pixel is set to 0, and Y-coordinate of uppermost pixel is set to 0.

Figure 3A:
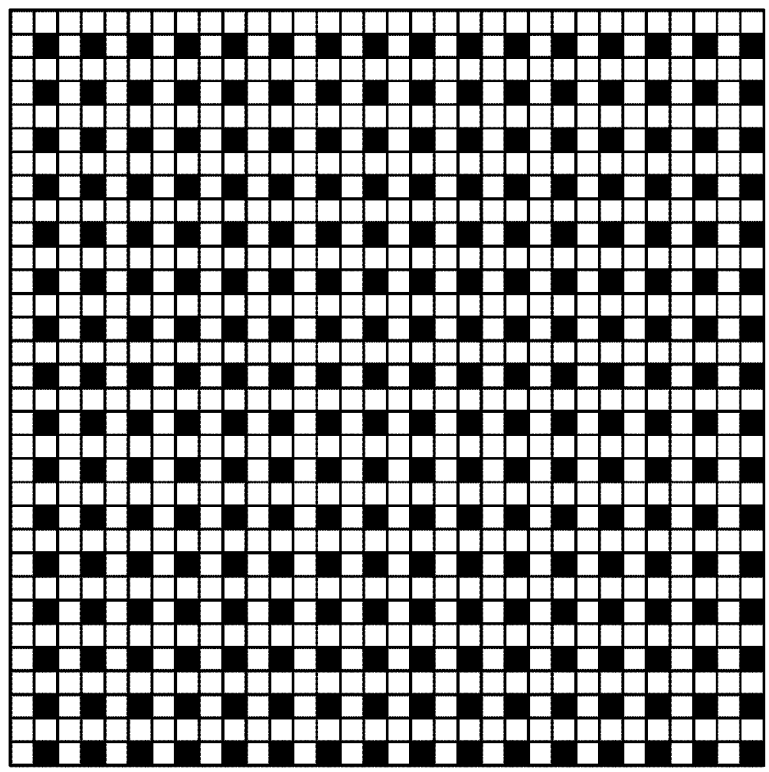
FIGS. 3A and 3B illustrate image reduction processing performed using a simple thinning method.
Figure 3B:
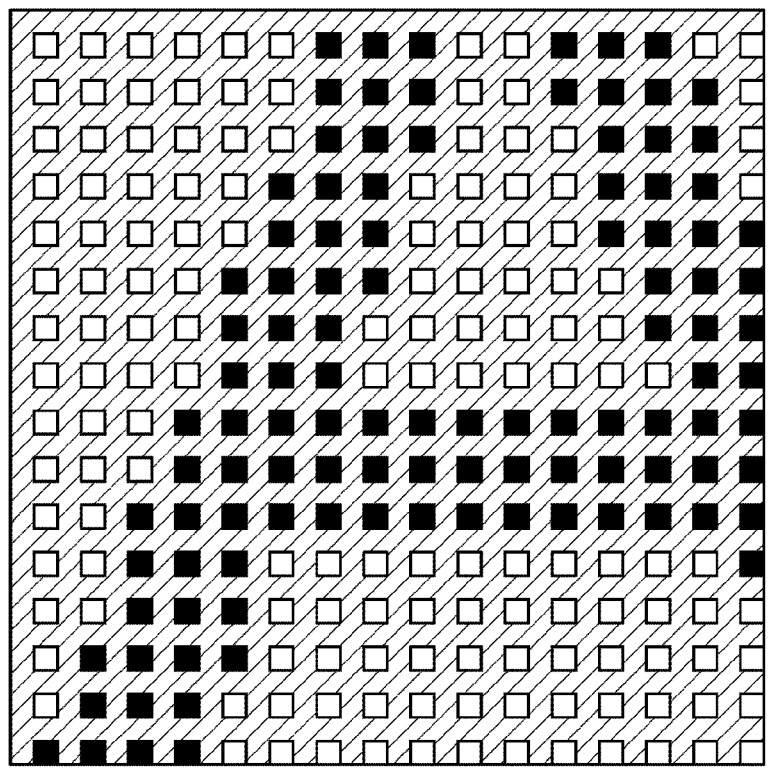

FIGS. 3A and 3B illustrate image reduction processing performed using the simple thinning method. Referring to FIG. 3A, the image data originally including 32 pixels in the vertical direction and 32 pixels in the horizontal direction is reduced using the simple thinning method. The thinned out pixels are indicated as white pixels, and remaining pixels are indicated as black pixels. In other words, the thinning process is equal to dividing the original image into blocks of 2 by 2 pixel size, and deleting all pixels in the 2 by 2 pixel block except for the lower-right pixel.

FIG. 3B is a schematic diagram illustrating the result of reducing the image data illustrated in FIG. 2A using the simple thinning method. Referring to FIG. 3B, the remaining pixels after performing thinning are indicated as the white pixels and the black pixels, and the portion of the image data in which the pixels have been thinned out is indicated as a shaded portion. The image data configured by such remaining pixels thus becomes reduced image data. The above-described image reduction processing is a resolution conversion process which reduces the resolution to half of the original resolution. Hereinafter, a numerical value of the resolution will be used to indicate a degree of reduction.

Figure 4A:
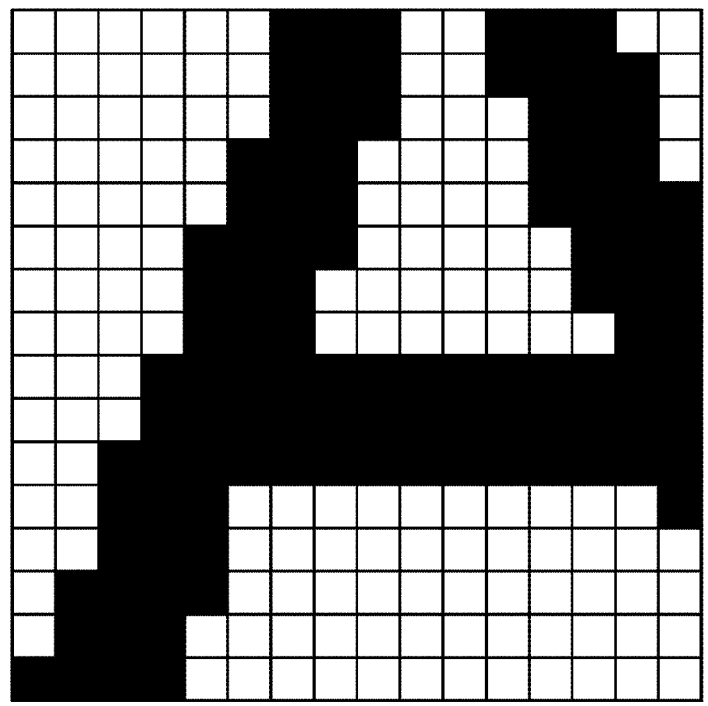
FIGS. 4A and 4B are schematic diagrams illustrating image data of 16 pixels in the vertical direction and 16 pixels in the horizontal direction having a resolution of 1200 dpi.
Figure 4B:
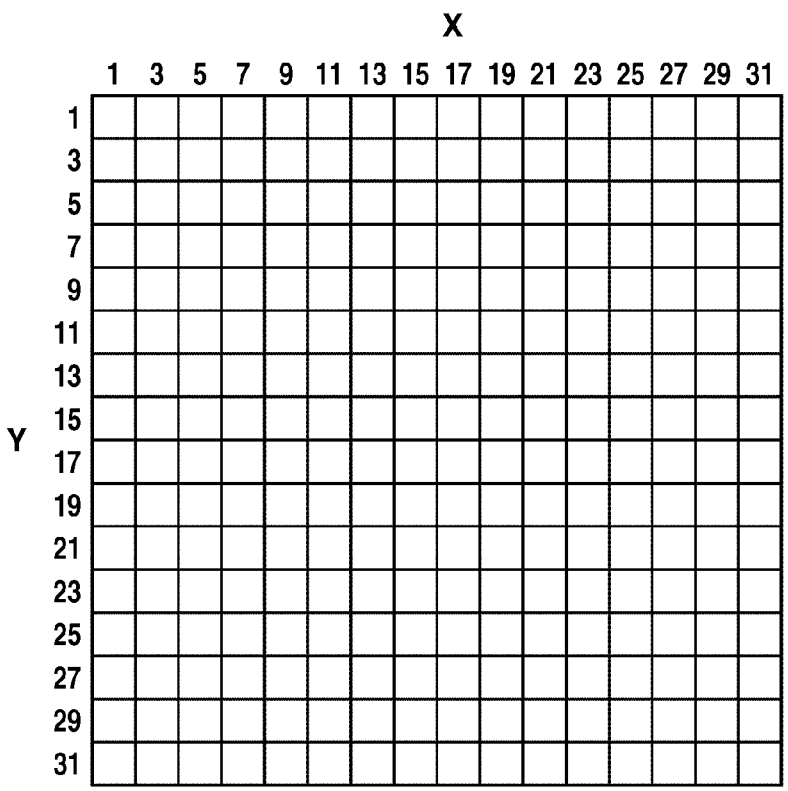

FIGS. 4A and 4B are schematic diagrams illustrating image data of 16 pixels in the vertical direction and 16 pixels in the horizontal direction having a resolution of 1200 dpi. FIG. 4A illustrates the image data in which the resolution has become half the original resolution by performing the simple thinning method using the image data illustrated in FIG. 2A as the original data. The value of each pixel is indicated in black or white. FIG. 4B illustrates the coordinates of each pixel, and the coordinates are assigned to the pixels remaining after performing simple thinning on the pixels in the image illustrated in FIG. 2.

Figure 5A:
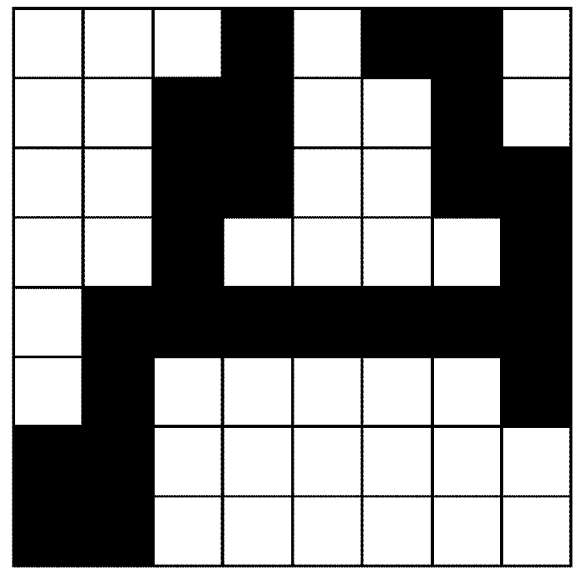
FIGS. 5A and 5B are schematic diagrams illustrating image data of 8 pixels in the vertical direction and 8 pixels in the horizontal direction having a resolution of 600 dpi.
Figure 5B:
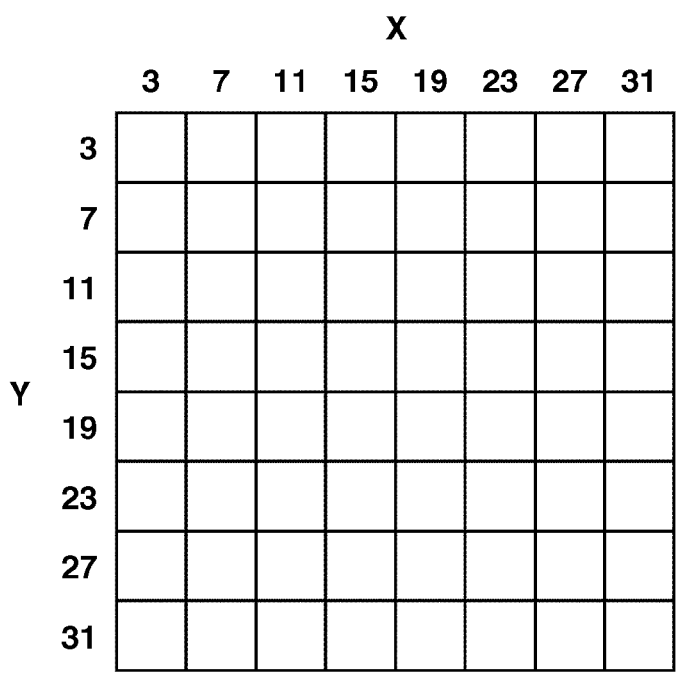

FIGS. 5A and 5B are schematic diagrams illustrating image data of 8 pixels in the vertical direction and 8 pixels in the horizontal direction having a resolution of 600 dpi. FIG. 5A illustrates the image data in which the resolution has become half the original resolution by performing the simple thinning method using the image data illustrated in FIG. 4A as the original data. The value of each pixel is indicated as black or white. FIG. 5B illustrates the coordinates of each pixel, and the coordinates are assigned to the pixels remaining after performing simple thinning on the pixels in the image illustrated in FIG. 4.

Figure 6:
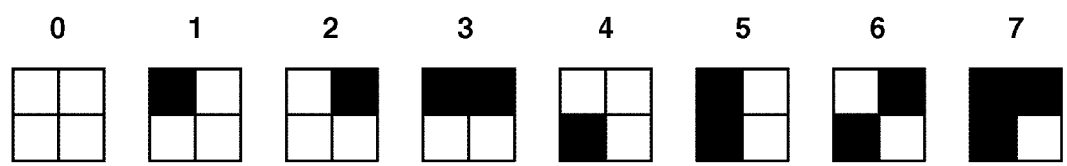
FIG. 6 is a list of arrangement patterns used in generating complementary information.

FIG. 6 illustrates a list of (eight) color arrangement patterns of the 2 by 2 pixel size blocks, used for generating complementary information. Referring to FIG. 6, the colors of the four pixels in each pattern do not directly indicate the pixel value, and indicate a condition of whether the pixel value is equal to the value of the lower right pixel to be a reference pixel.

The white pixel among the four pixels in each arrangement pattern indicates a pixel having the same pixel value as the value of the reference lower right pixel. Further, the black pixel indicates a pixel having a different pixel value as the value of the reference lower right pixel.

More specifically, the condition for determining the block to match pattern 0 is for all four pixels to be of the same pixel value. The block is determined to match pattern 1 when the upper right pixel and the lower left pixel have the same pixel values as the reference lower right pixel, and the upper left pixel having the different pixel value. The conditions for determining the block to match the other patterns are similar, i.e., only the black pixels have a different pixel value from the reference lower right pixel, and the white pixels have the same pixel value as the lower right pixel.

The complementary information generation unit 103 compares and determines whether each of the blocks including four pixels (i.e., 2 by 2 pixels) in the input image data matches one of the patterns. The complementary information generation unit 103 then generates the complementary information based on the comparison and determination results. The complementary information generated according to the present exemplary embodiment includes for each block of 2 by 2 pixels, a pattern number indicating one of the patterns among the patterns illustrated in FIG. 6 to which the block matches. Further, the complementary information includes the pixels values of all pixels having a different pixel value from the lower right reference pixel.

FIG. 7 is a schematic diagram illustrating the complementary information generated by the complementary information generation unit 103 based on an input of the image data illustrated in FIG. 2A. The complementary information includes the pixels values different from that of the reference pixel (i.e., the lower right pixel among the 2 by 2 pixels) and the pattern number. FIG. 7 illustrates only the pattern numbers among such complementary information. The numerical value in each cell thus indicates the pattern number acquired for each block when the original image illustrated in FIG. 2A is divided into blocks of 2 by 2 pixels.

The complementary information generation unit 103 actually outputs for the pattern other than pattern 0, the pixel values different from the pixel value of the reference lower right pixel, as a group along with the pattern number. The patterns 1, 2, and 4 which include one different pixel thus have one pixel value in the group. The patterns 3, 5, and 6 which include two different pixels have two pixel values in the group. The pattern 7 which includes three different pixels has three pixel values in the group.

The original image data can be restored using the pixel value of the reference lower right pixel along with the complementary information (i.e., the group of pattern number and pixel values). On the other hand, FIG. 4A is an image generated by the lower right pixels for each block of 2 by 2 pixels by performing the simple thinning method with respect to the image illustrated in FIG. 2A.

As a result, if the complementary information is combined with the pixel values illustrated in FIG. 4A, the image data illustrated in FIG. 2A, i.e., the original image data, can be restored.

FIG. 8 is a schematic diagram illustrating the complementary information generated by the complementary information generation unit 103 based on an input of the image data illustrated in FIG. 4A. The complementary information includes the pixel values that are different from that of the reference pixel (i.e., the lower right pixel among the 2 by 2 pixels) and the pattern number. FIG. 8 illustrates only the pattern numbers among such complementary information. The numerical value in each cell thus indicates the pattern number acquired for each block when the original image illustrated in FIG. 4A is divided into blocks of 2 by 2 pixels.

The image data illustrated in FIG. 4A, i.e., the original image data, can then be restored from the complementary information (i.e., the group of pattern number and pixel values illustrated in FIG. 8) and the pixel values illustrated in FIG. 5A (i.e., the pixel values of the reference pixels).

As described above, the image illustrated in FIG. 4A can be restored using the complementary information illustrated in FIG. 8 and the pixel values illustrated FIG. 5A. Further, the image data illustrated in FIG. 2A, i.e., the original image data with respect to FIG. 4A, can be restored using the complementary information illustrated in FIG. 7 similarly.

Figure 9A:
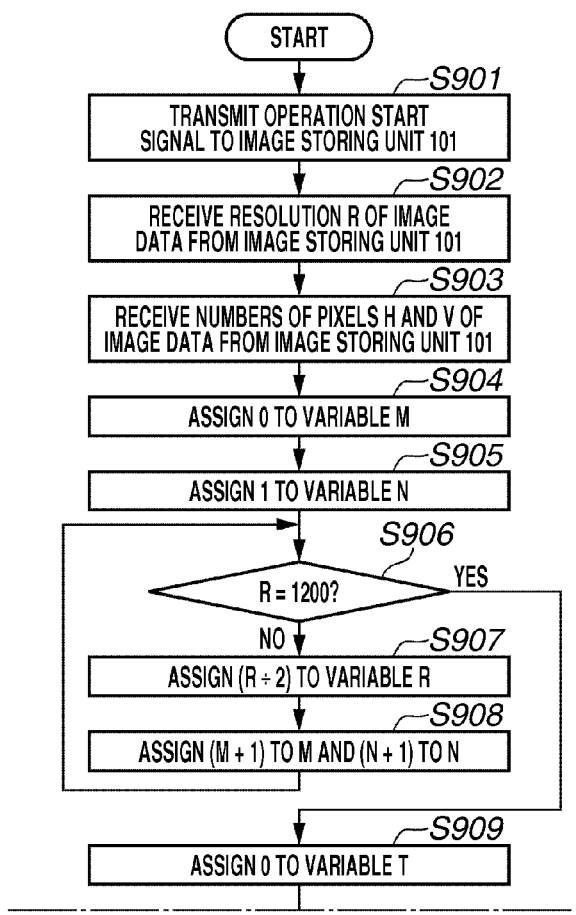
FIG. 9 (including 9A+9B) is a flowchart illustrating a process performed by a control unit 107.
Figure 9:
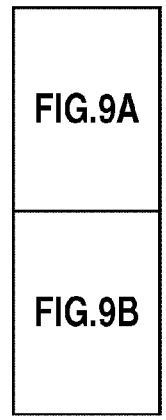
Figure 9B:
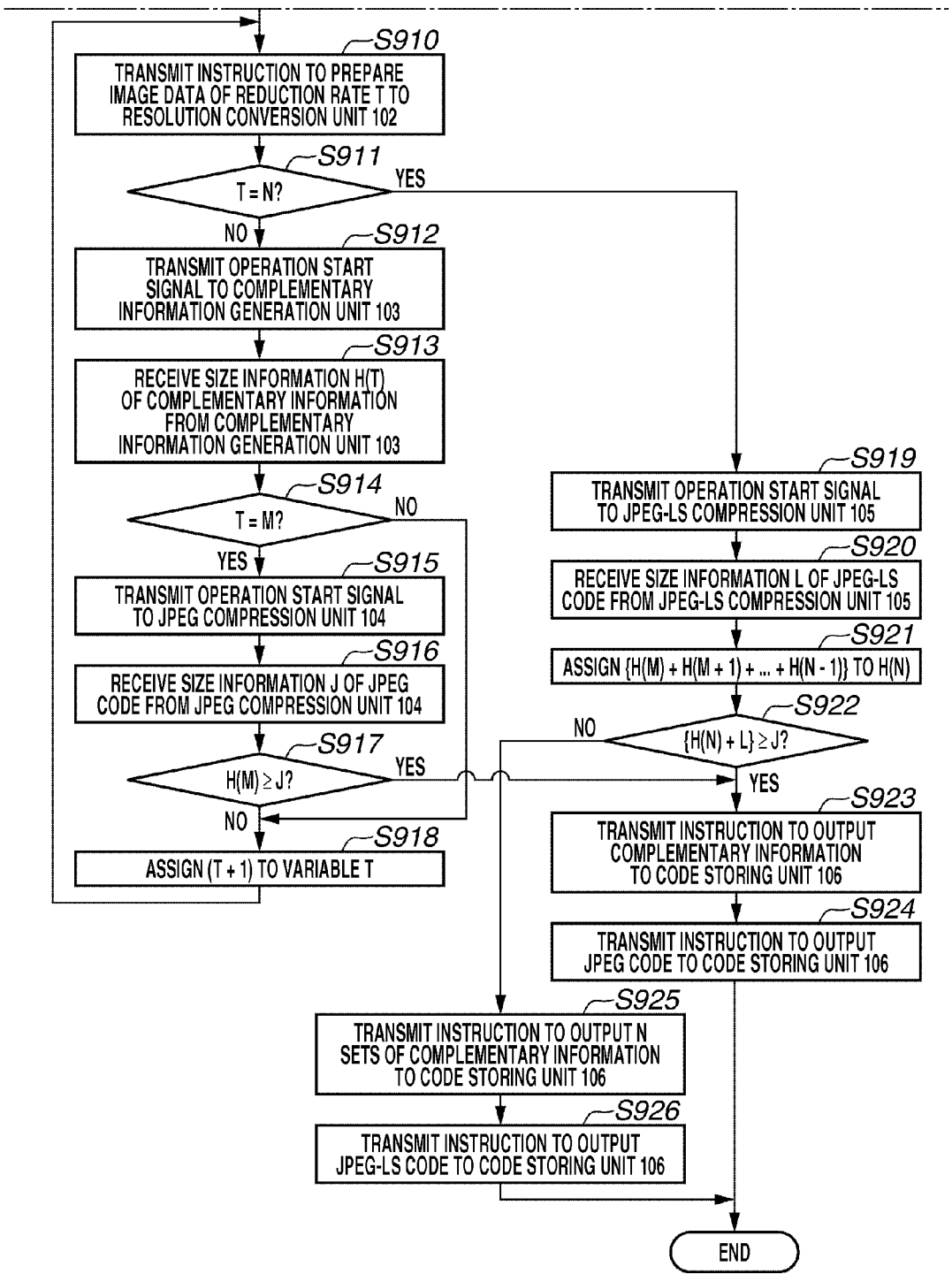

FIG. 9 (9A+9B) is a flowchart illustrating a process performed by the control unit 107. The control unit 107 controls the operations of the entire image compression apparatus 1. The process illustrated in the flowchart of FIG. 9 realizes a series of operations of the processes performed by the image compression apparatus 1.

The image compression apparatus according to the present exemplary embodiment outputs the complementary information and the code data (i.e., the data acquired by further compress-coding the image data configured by the reference pixels) by inputting the image data and performing image compression.

The image compression process includes a complementary information generation process for generating the complementary information (i.e., the pattern number and the pixel values different from the reference pixel value). The complementary information is information used for restoring the resolution-converted image data to the image data of the original resolution. Further, the image compression process includes a JPEG compression process which performs lossy image compression on the image data configured based on the reference pixels (i.e., the low resolution image data generated by performing the simple thinning method). Furthermore, the image compression process includes a JPEG-LS compression process which performs lossless image compression on the image data configured based on the reference pixels (i.e., the low resolution image data generated by performing the simple thinning method).

According to the present exemplary embodiment, the image compression apparatus outputs M sets of complementary information and the JPEG code, or N sets of complementary information and the JPEG-LS code, either of which whose total size is smaller. The image compression apparatus according to the present exemplary embodiment can reduce image quality deterioration by switching processes between the JPEG compression process and the JPEG-LS compression process. Each of the steps will be described below.

In step S901, the control unit 107 transmits to the image storing unit 101 an operation start signal. The process performed by the image storing unit 101 will be described below.

In step S902, the control unit 107 receives from the image storing unit 101 the resolution information of the image data as a numerical value in units of dpi, and assigns the resolution information to a variable R. According to the present exemplary embodiment, the value of the resolution is one of the numerical values acquired by multiplying 1200 by powers-of-two (e.g., 1200, 2400, 4800, and 9600).

In step S903, the control unit 107 receives from the image storing unit 101 pixel number information of the image data in the horizontal direction and the vertical direction respectively, and assigns the pixel number information to a variable X and a variable Y.

In step S904, the control unit 107 assigns 0 to the variable M and performs initialization.

In step S905, the control unit 107 then assigns 1 to the variable N and performs initialization. The initial value is a setting value (i.e., the initial value) for identifying the resolution at which JPEG-LS compression is to be performed. More specifically, the value indicates that JPEG-LS compression is to be performed after performing resolution conversion in which the resolution is reduced to $1/(2^{\text{initial value}} N))$ of the original resolution. The resolution conversion starts from the resolution at which the JPEG-LS compression is to be performed.

The setting value of the variable N in the flowchart illustrated in FIG. 9 is set to 1 for ease of description. However, the resolution at which JPEG-LS compression is performed can be changed by setting a different value to the variable N.

In step S906, the control unit 107 determines whether the value of the variable R is 1200. If the value of the variable R is 1200 (YES in step S906), the process proceeds to step S909. "$1/(2^M)$" employing the value of the variable M when the variable R is determined to be 1200 indicates a reduction rate which is necessary for converting the resolution of the input image data to 1200 dpi. Further, "$1/(2^N)$" employing the value of the variable N when the variable R is determined to be 1200 indicates a reduction rate which is necessary for converting the resolution of the input image data to 600 dpi in the case where the initial value of N is 1.

On the other hand, if the value of the variable R is not 1200 (NO in step S906), the process proceeds to step S907. "1200" indicates the resolution at which JPEG compression is to be performed. The fixed value is set to 1200 in the flowchart illustrated in FIG. 9 for ease of description. However, the resolution at which JPEG compression is to be performed can be changed by changing the comparison value to another value.

In step S907, the control unit 107 assigns (R+2) to the variable R.

In step S908, the control unit 107 assigns (M+1) to the variable M and (N+1) to the variable N.

In step S909, the control unit 107 assigns 0 to a variable T. The variable T is a variable used for instructing the resolution conversion unit 102 of the reduction rate. Upon receiving the reduction instruction of the variable T, the resolution conversion unit 102 performs resolution conversion to reduce the resolution to $1/(2^T)$ times the original resolution. Hereinafter, reduction of the resolution to $1/(2^T)$ times the original resolution will be simply indicated as a reduction rate T.

In step S910, the control unit 107 transmits to the resolution conversion unit 102 the instruction of performing resolution conversion of the reduction rate T (i.e., transmit to the resolution conversion unit 102 an instruction to prepare the image data including the pixel data acquired by performing thinning so that the resolution becomes $1/(2^T)$ times the original resolution). Further, the control unit 107 transmits to the resolution conversion unit 102 at the same time the pixel numbers X and Y of the image data. The process performed by the resolution conversion unit 102 will be described below.

In step S911, the control unit 107 determines whether the variable T is the same value as the variable N. If the variable T is the same value as the variable N (YES in step S911), the process proceeds to step S919. In such a case, the resolution conversion unit 102 performs resolution conversion of the reduction rate N, and the resolution of the image data output from the resolution conversion unit 102 thus becomes 600 dpi. If the variable T is not the same value as the variable N (NO in step S911), the process proceeds to step S912.

In step S912, the control unit 107 transmits the operation start signal to the complementary information generation unit 103. The process performed by the complementary information generation unit 103 will be described below.

In step S913, the control unit 107 receives and assigns to a variable H (T) the size information of the complementary information generated by the complementary information generation unit 103. If reduction is performed a plurality of times, a plurality of complementary information is generated. The variable H (T) is thus an array type variable for storing each of the size information.

In step S914, the control unit 107 determines whether the value of the variable T is the same as the value of the variable M. If the value of the variable T is the same as the value of the variable M (YES in step S914), the process proceeds to step S915. In such a case, the resolution conversion unit 102 performs resolution conversion of the reduction rate M, and the resolution of the image data output from the resolution conversion unit 102 thus becomes 1200 dpi. If the variable T is not the same value as the variable M (NO in step S914), the process proceeds to step S918.

In step S915, the control unit 107 transmits the operation start signal to the JPEG compression unit 104. The process performed by the JPEG compression unit 104 will be described below.

In step S916, the control unit 107 receives from the JPEG compression unit 104 and assigns to a variable J the size information of the JPEG code.

In step S917, the control unit 107 determines whether the variable H (M) is greater than or equal to the variable J. If the variable H (M) is greater than or equal to the variable J (YES in step S917), the process proceeds to step S923. More specifically, in step S917, the control unit 107 compares the size H (M) of the complementary information with the size J after performing JPEG coding. If the size of the complementary information is greater than or equal to the size of the JPEG code, the process proceeds to step S923 without performing JPEG-LS compression (i.e., processes of step S919 to step S922). Conditional branching is thus performed. On the other hand, if the variable H (M) is smaller than the variable J (NO in step S917), the process proceeds to step S918.

In step S918, the control unit 107 assigns (T+1) to the variable T, and the process then returns to step S910.

In step S919, the control unit 107 transmits the operation start signal to the JPEG-LS compression unit 105. The process performed by the JPEG-LS compression unit 105 will be described below.

In step S920, the control unit 107 receives from the JPEG-LS compression unit 105 and assigns to a variable L the size information of the JPEG-LS code.

In step S921, the control unit 107 assigns {H (M)+H (M+1)+ . . . +H (N−1)} to a variable H (N). Such a value indicates a sum of the size information of the complementary information generated from the image data of each resolution of the reduction rate M to the reduction rate (N−1). According to the present exemplary embodiment, 0 and 1 are respectively assigned to M and N in step S904 and step S905, and M is the same as (N−1). The value assigned to H (N) thus becomes the value of H (M).

In step S922, the control unit 107 determines whether the value of {H (N)+L} is greater than or equal to the variable J. If the value of {H (N)+L} is greater than or equal to the variable J (YES in step S922), the process proceeds to step S923. More specifically, in step S922, the control unit 107 compares the sum of the sizes of the complementary information and the JPEG-LS code with the size of the JPEG code. The control unit 107 then selects the compression method in which the size becomes smaller. Conditional branching is thus performed in step S922. On the other hand, if the value of {H (N)+L} is smaller the variable J (NO in step S922), the process proceeds to step S925.

In step S923, the control unit 107 transmits to the code storing unit 106 the instruction to output M sets of complementary information. In other words, the control unit 107 instructs outputting M sets of complementary information generated from the image data of M number of resolutions, from reduction rate 0 to reduction rate (M−1).

In step S924, the control unit 107 transmits to the code storing unit 106 an instruction to output the JPEG code, and then, the process ends.

In step S925, the control unit 107 transmits to the code storing unit 106 the instruction to output N sets of complementary information. In other words, the control unit 107 instructs outputting N sets of complementary information generated from the image data of N number of resolutions, from reduction rate 0 to reduction rate (N−1).

In step S926, the control unit 107 transmits to the code storing unit 106 an instruction to output the JPEG-LS code, and then, the process ends.

In other words, the compressed data output from the code storing unit 106 as a result of the above-described process is either "M sets of complementary information and the JPEG code" output in step S923 to step S924, or "N sets of complementary information and the JPEG-LS code" output in step S925 to step S926. The combination to be output is determined based on each of the data sizes of the complementary information, the JPEG code, and the JPEG-LS code.

FIGS. 10A and 10B are flowcharts illustrating processes performed by the image storing unit 101. The image storing unit 101 internally performs the two processes in parallel. The processes are illustrated in FIG. 10A and in FIG. 10B, respectively.

The process performed by the image storing unit 101 in each of the steps illustrated in the flowchart of FIG. 10A will be described below.

In step S1001, the image storing unit 101 receives the operation start signal which the control unit 107 has transmitted in step S901 illustrated in FIG. 9. The process then proceeds to step S1002. The image storing unit 101 stands by in step S1001 until the signal is received.

In step S1002, the image storing unit 101 clears an internal buffer for storing the image data.

In step S1003, the image storing unit 101 receives and stores in the internal buffer the image data input from outside the image compression apparatus 1. The image storing unit 101 also receives the resolution information of the image data, and stores the resolution information in the internal buffer. The resolutions are multiples of 1200, such as 1200, 2400, 4800, and 9600.

In step S1004, the image storing unit 101 transmits the resolution information of the image data to the control unit 107. The control unit 107 thus receives in step S902 illustrated in FIG. 9 the resolution information of the image data transmitted from the image storing unit 101.

In step S1005, the image storing unit 101 transmits the pixel number information of the image data to the control unit 107. The control unit 107 thus receives in step S903 illustrated in FIG. 9 the pixel number information of the image data transmitted from the image storing unit 101.

The process performed by the image storing unit 101 in each of the steps illustrated in the flowchart of FIG. 10B will be described below.

In step S1006, the image storing unit 101 receives a pixel data request signal form the resolution conversion unit 102. The process then proceeds to step S1007. The pixel data request signal includes coordinate values I and J for identifying the pixels in the image data. The image storing unit 101 stands by in step S1006 until the pixel data request signal is received.

In step S1007, the image storing unit 101 reads the pixel data of the coordinates (I, J) from the internal buffer storing the image data. The image storing unit 101 then transmits the read pixel data to the resolution conversion unit 102.

FIGS. 11A, 11B, 11C, and 11D are flowcharts illustrating the processes performed by the resolution conversion unit 102. The resolution conversion unit 102 internally performs the four processes in parallel. The processes are illustrated in FIGS. 11A, 11B, 11C, and 11D respectively.

Figure 11A:
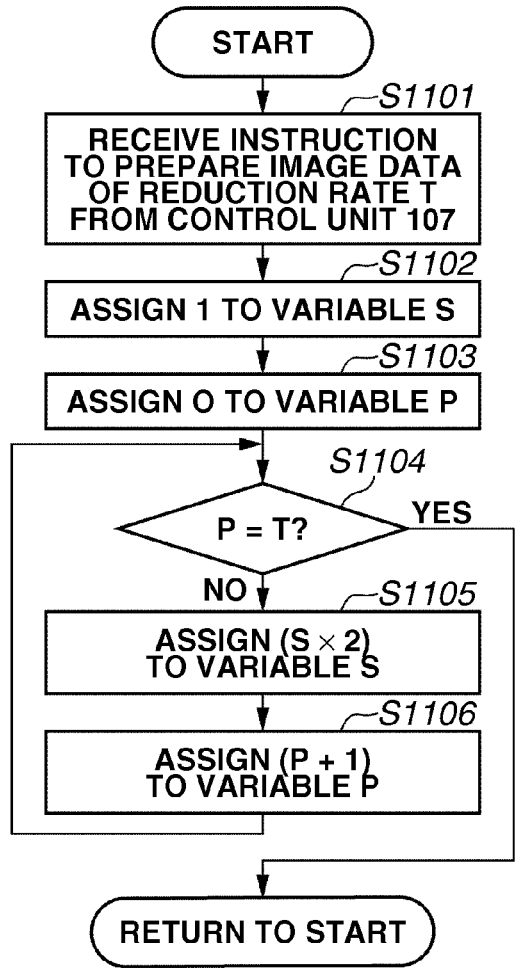

The process performed by the resolution conversion unit 102 in each of the steps illustrated in the flowchart of FIG. 11A will be described below.

In step S1101, if the resolution conversion unit 102 receives from the control unit 107 the instruction to perform resolution conversion of the reduction rate T transmitted in step S910 illustrated in FIG. 9, the process proceeds to step S1102. The resolution conversion unit 102 also receives from the control unit 107, the number of pixels X in the horizontal direction and the number of pixels Y in the vertical direction at the same time. The resolution conversion unit 102 stands by in step S1101 until the instruction is received.

In step S1102, the resolution conversion unit 102 assigns 1 to a variable S. In step S1103, the resolution conversion unit 102 assigns 0 to a variable P.

In step S1104, the resolution conversion unit 102 determines whether the value of the variable P is equal to the value of the reduction rate T. If the value of the variable P is equal to the value of the reduction rate T (YES in step S1104), the process returns to step S1101. If the value of the variable P is not equal to the value of the reduction rate T (NO in step S1104), the process proceeds to step S1105.

In step S1105, the resolution conversion unit 102 assigns (S×2) to the variable S. In step S1106, the resolution conversion unit 102 assigns (P+1) to the variable P. The process then returns to step S1104.

The process performed by the resolution conversion unit 102 in each of the steps illustrated in the flowchart of FIG. 11B will be described below.

In step S1107, if the resolution conversion unit 102 receives an image data request signal form the complementary information generation unit 103, the process proceeds to step S1108. The resolution conversion unit 102 stands by in step S1107 until the image data request signal is received.

In step S1108, the resolution conversion unit 102 assigns the value of the variable S to a variable B. In step S1109, the resolution conversion unit 102 assigns the value of the variable S to a variable A.

In step S1110, the resolution conversion unit 102 transmits to the image storing unit 101 the request signal for acquiring pixel data (A−1, B−1). The pixel data (A−1, B−1) is the pixel data of the coordinates (A−1, B−1). The image storing unit 101 thus receives in step S1006 illustrated in FIG. 10B the pixel data request signal transmitted from the resolution conversion unit 102.

In step S1111, the resolution conversion unit 102 acquires the pixel data transmitted from the image storing unit 101 in step S1007 illustrated in FIG. 10B in response to the request.

In step S1112, the resolution conversion unit 102 transmits the acquired pixel data to the complementary information generation unit 103.

In step S1113, the resolution conversion unit 102 determines whether the value of the variable A matches the number of pixels X in the horizontal direction. If the value of the variable A matches the number of pixels X in the horizontal direction (YES in step S1113), the process proceeds to step S1115. On the other hand, if the value of the variable A does not match the number of pixels X in the horizontal direction (NO in step S1113), the process proceeds to step S1114.

In step S1114, the resolution conversion unit 102 assigns (A+S) to the variable A, and the process returns to step S1110.

In step S1115, the resolution conversion unit 102 determines whether the value of the variable B matches the number of pixels Y in the vertical direction. If the value of the variable B matches the number of pixels Y in the vertical direction (YES in step S1115), the process returns to step S1107. If the value of the variable B does not match the number of pixels Y in the vertical direction (NO in step S1115), the process proceeds to step S1116.

In step S1116, the resolution conversion unit 102 assigns (B+S) to the variable B, and the process returns to step S1109.

In other words, the resolution conversion unit 102 repeatedly performs the processes of step S1110 to step S1116 with respect to the pixels in the horizontal direction and the pixels in the vertical direction, in a double loop for each value of the variable S. More specifically, the resolution conversion unit 102 transmits the pixel data request signal to the image storing unit 101 (i.e., step S1110), receives the pixel data from the image storing unit 101 (i.e., step S1111), and transmits the pixel data to the complementary information generation unit 103 (i.e., step S1112).

The process performed by the resolution conversion unit 102 in each of the steps illustrated in the flowchart of FIG. 11C will be described below.

In step S1117, if the resolution conversion unit 102 receives the image data request signal form the JPEG compression unit 104, the process proceeds to step S1118. The resolution conversion unit 102 stands by in step S1117 until the image data request signal is received.

In step S1118, the resolution conversion unit 102 assigns the value of the variable S to a variable D. In step S1119, the resolution conversion unit 102 assigns the value of the variable S to a variable C.

In step S1120, the resolution conversion unit 102 transmits to the image storing unit 101 the request signal for acquiring pixel data (C−1, D−1). The pixel data (C−1, D−1) is the pixel data of the coordinates (C−1, D−1). The image storing unit 101 thus receives in step S1006 illustrated in FIG. 10B the pixel data request signal transmitted from the resolution conversion unit 102.

In step S1121, the resolution conversion unit 102 acquires the pixel data transmitted from the image storing unit 101 in step S1007 illustrated in FIG. 10B in response to the request.

In step S1122, the resolution conversion unit 102 transmits the acquired pixel data to the JPEG compression unit 104.

In step S1123, the resolution conversion unit 102 determines whether the value of the variable C matches the number of pixels X in the horizontal direction. If the value of the variable C matches the number of pixels X in the horizontal direction (YES in step S1123), the process proceeds to step S1125. If the value of the variable C does not match the number of pixels X in the horizontal direction (NO in step S1123), the process proceeds to step S1124.

In step S1124, the resolution conversion unit 102 assigns (C+S) to the variable C, and the process returns to step S1120.

In step S1125, the resolution conversion unit 102 determines whether the value of the variable D matches the number of pixels Y in the vertical direction. If the value of the variable D matches the number of pixels Y in the vertical direction (YES in step S1125), the process returns to step S1117. If the value of the variable D does not match the number of pixels Y in the vertical direction (NO in step S1125), the process proceeds to step S1126.

In step S1126, the resolution conversion unit 102 assigns (D+S) to the variable D, and the process returns to step S1119.

In other words, the resolution conversion unit 102 repeatedly performs the processes of step S1119 to step S1126 with respect to the pixels in the horizontal direction and the pixels in the vertical direction, in a double loop for each value of the variable S. More specifically, the resolution conversion unit 102 transmits the pixel data request signal to the image storing unit 101 (i.e., step S1120), receives the pixel data from the image storing unit 101 (i.e., step S1121), and transmits the pixel data to the JPEG compression unit 104 (i.e., step S1122).

The process performed by the resolution conversion unit 102 in each of the steps illustrated in the flowchart of FIG. 11D will be described below.

In step S1127, if the resolution conversion unit 102 receives the image data request signal form the JPEG-LS compression unit 105, the process proceeds to step S1128. The resolution conversion unit 102 stands by in step S1127 until the image data request signal is received.

In step S1128, the resolution conversion unit 102 assigns the value of the variable S to a variable F. In step S1129, the resolution conversion unit 102 assigns the value of the variable S to a variable E.

In step S1130, the resolution conversion unit 102 transmits to the image storing unit 101 the request signal for acquiring pixel data (E−1, F−1). The pixel data (E−1, F−1) is the pixel data of the coordinates (E−1, F−1). The image storing unit 101 thus receives in step S1006 illustrated in FIG. 10B the pixel data request signal transmitted from the resolution conversion unit 102.

In step S1131, the resolution conversion unit 102 acquires the pixel data transmitted from the image storing unit 101 in step S1007 illustrated in FIG. 10B in response to the request.

In step S1132, the resolution conversion unit 102 transmits the acquired pixel data to the JPEG-LS compression unit 105.

In step S1133, the resolution conversion unit 102 determines whether the value of the variable E matches the number of pixels X in the horizontal direction. If the value of the variable E matches the number of pixels X in the horizontal direction (YES in step S1133), the process proceeds to step S1135. If the value of the variable E does not match the number of pixels X in the horizontal direction (NO in step S1133), the process proceeds to step S1134.

In step S1134, the resolution conversion unit 102 assigns (E+S) to the variable E, and the process returns to step S1120.

In step S1135, the resolution conversion unit 102 determines whether the value of the variable F matches the number of pixels Y in the vertical direction. If the value of the variable F matches the number of pixels Y in the vertical direction (YES in step S1135), the process returns to step S1127. If the value of the variable F does not match the number of pixels Y in the vertical direction (NO in step S1135), the process proceeds to step S1136.

In step S1136, the resolution conversion unit 102 assigns (F+S) to the variable F, and the process returns to step S1129.

In other words, the resolution conversion unit 102 repeatedly performs the processes of step S1129 to step S1136 with respect to the pixels in the horizontal direction and the pixels in the vertical direction, in a double loop for each value of the variable S. More specifically, the resolution conversion unit 102 transmits the pixel data request signal to the image storing unit 101 (i.e., step S1130), receives the pixel data from the image storing unit 101 (i.e., step S1131), and transmits the pixel data to the JPEG-LS compression unit 104 (i.e., step S1132).

Figure 12A:
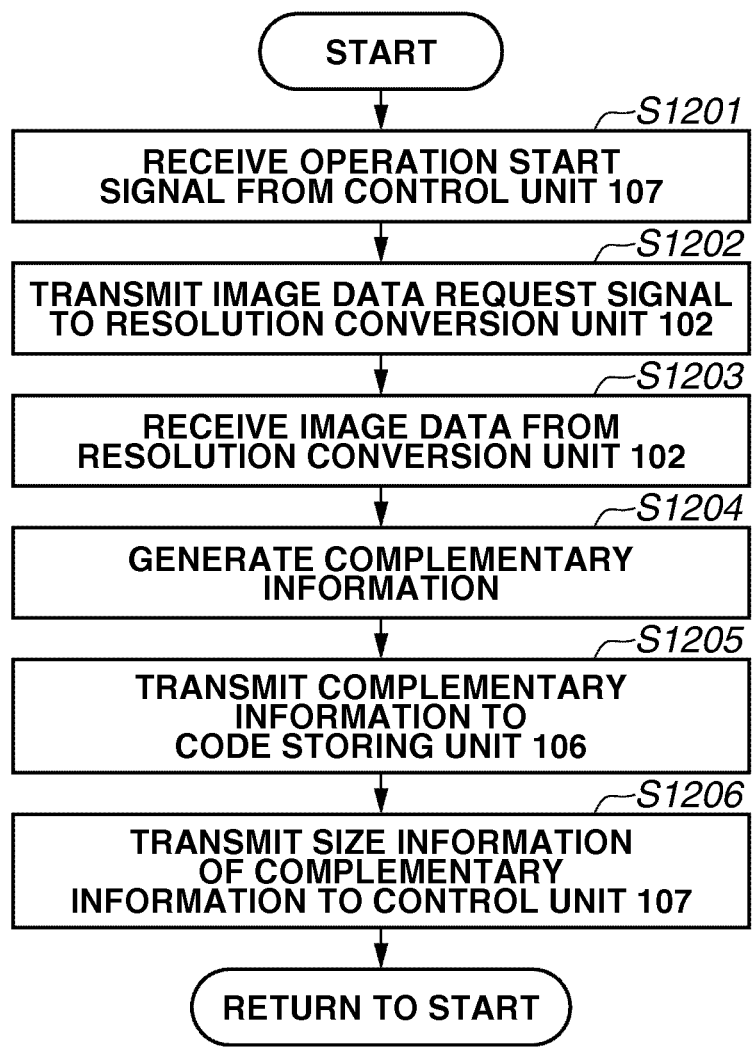
FIGS. 12A, 12B, and 12C are flowcharts illustrating processes performed by the complementary information generation unit 103, a joint photographic experts group (JPEG) compression unit 104, and a JPEG-Lossless (LS) compression unit 105.
Figure 12B:
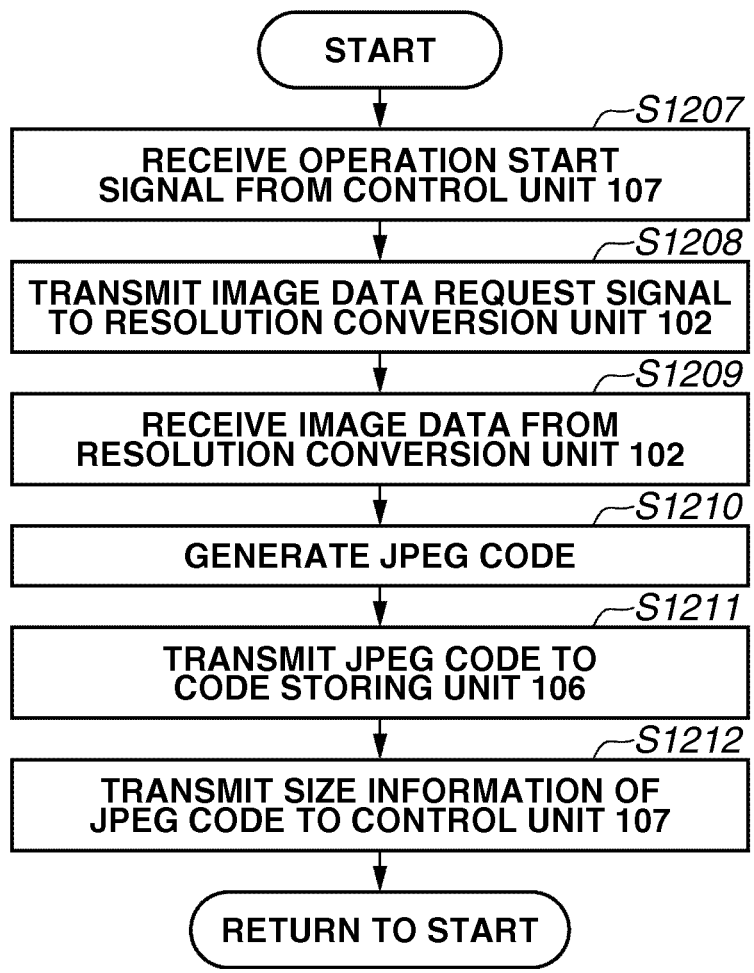
Figure 12C:
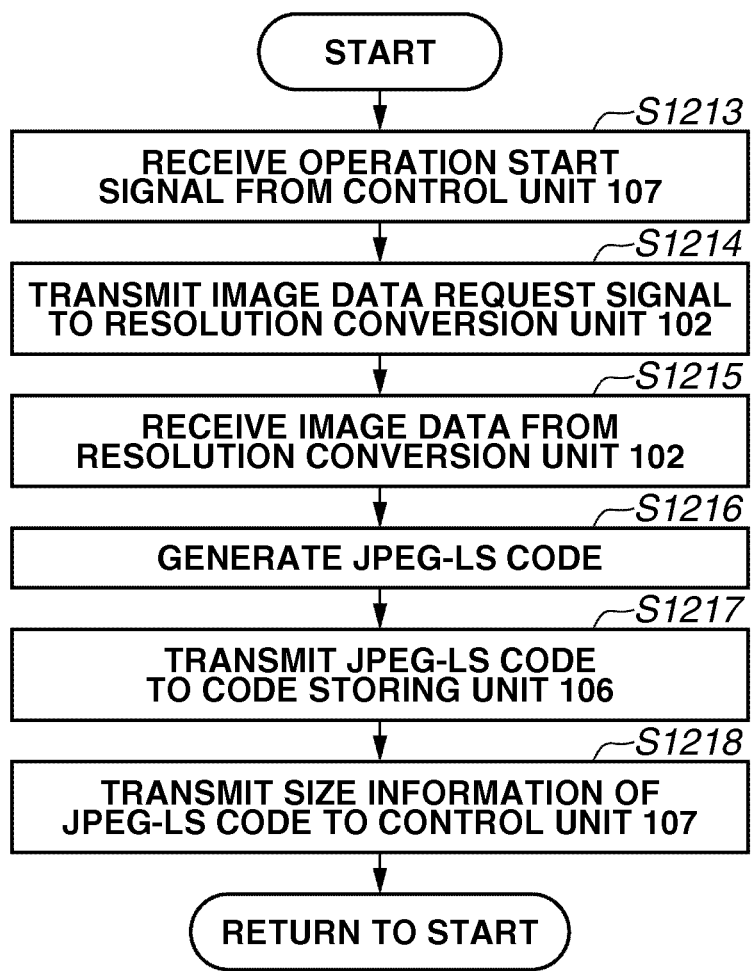

FIGS. 12A, 12B, and 12C are flowcharts illustrating the processes performed by the complementary information generation unit 103, the JPEG compression unit 104, and the JPEG-LS compression unit 105 respectively.

The process performed by the complementary information generation unit 103 will be described below with reference to FIG. 12A.

In step S1201, if the complementary information generation unit 103 receives the operation start signal transmitted from the control unit 107 in step S912 illustrated in FIG. 9, the process proceeds to step S1202. The complementary information generation unit 103 stands by in step S1201 until the signal is received.

In step S1202, the complementary information generation unit 103 transmits the image data request signal to the resolution conversion unit 102. The resolution conversion unit 102 thus receives in step S1107 illustrated in FIG. 11B described above the image data request signal transmitted from the complementary information generation unit 103.

Figure 11B:
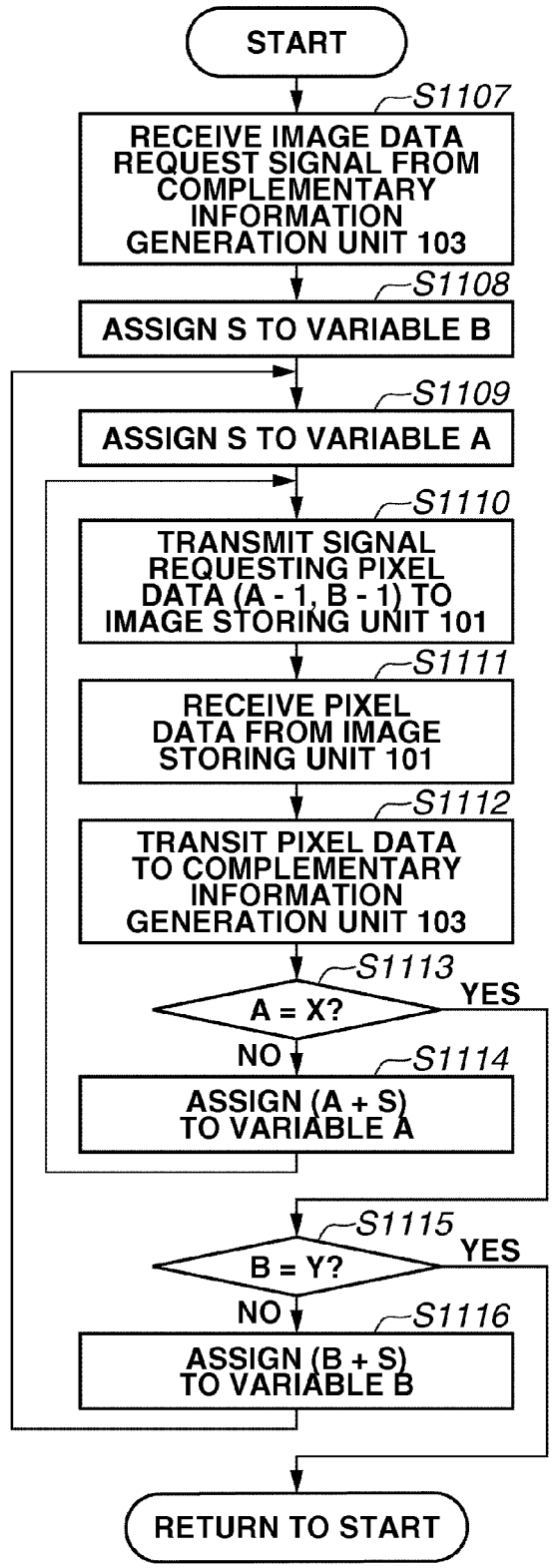

In step S1203, the complementary information generation unit 103 receives the pixel data transmitted from the resolution conversion unit 102 in step S1112 illustrated in FIG. 11B, in response to the request. All of the received pixel data thus configures the image data.

In step S1204, the complementary information generation unit 103 generates the complementary information from the received pixel data. The complementary information generation unit 103 also generates the size information of the complementary information at the same time.

In step S1205, the complementary information generation unit 103 transmits the complementary information to the code storing unit 106.

In step S1206, the complementary information generation unit 103 transmits the size information of the complementary information to the control unit 107. The control unit 107 thus receives in step S913 illustrated in FIG. 9 as described above, the size information of the complementary information transmitted from the complementary information generation unit 103.

The process performed by the JPEG compression unit 104 will be described below with reference to FIG. 12B.

In step S1207, if the JPEG compression unit 104 receives the operation start signal transmitted from the control unit 107 in step S915 illustrated in FIG. 9, the process proceeds to step S1208. The JPEG compression unit 104 stands by in step S1207 until the signal is received.

In step S1208, the JPEG compression unit 104 transmits the image data request signal to the resolution conversion unit 102. The resolution conversion unit 102 thus receives in step S1117 illustrated in FIG. 11C described above the image data request signal transmitted from the JPEG compression unit 104.

In step S1209, the JPEG compression unit 104 receives the pixel data transmitted from the resolution conversion unit 102 in step S1122 illustrated in FIG. 11C, in response to the request. All of the received pixel data thus configures the image data.

In step S1210, the JPEG compression unit 104 generates the JPEG code by performing JPEG compression on the received image data. The JPEG compression unit 104 also generates the size information of the JPEG code at the same time. Detailed description on the process of generating the JPEG code will be omitted.

In step S1211, the JPEG compression unit 104 transmits the generated JPEG code to the code storing unit 106.

In step S1212, the JPEG compression unit 104 transmits the size information of the JPEG code to the control unit 107. The control unit 107 thus receives in step S916 illustrated in FIG. 9 as described above, the size information of the JPEG code transmitted from the JPEG compression unit 104.

The process performed by the JPEG-LS compression unit 105 will be described below with reference to FIG. 12C.

In step S1213, if the JPEG-LS compression unit 105 receives the operation start signal transmitted from the control unit 107 in step S919 illustrated in FIG. 9, the process proceeds to step S1214. The JPEG-LS compression unit 105 stands by in step S1213 until the signal is received.

In step S1214, the JPEG-LS compression unit 105 transmits the image data request signal to the resolution conversion unit 102. The resolution conversion unit 102 thus receives in step S1127 illustrated in FIG. 11D described above the image data request signal transmitted from the JPEG-LS compression unit 105.

In step S1215, the JPEG-LS compression unit 105 receives the pixel data transmitted from the resolution conversion unit 102 in step S1132 illustrated in FIG. 11D, in response to the request. All of the received pixel data thus configures the image data.

In step S1216, the JPEG-LS compression unit 105 generates the JPEG-LS code by performing JPEG-LS compression on the received image data. The JPEG-LS compression unit 105 also generates the size information of the JPEG-LS code at the same time. Detailed description on the process of generating the JPEG-LS code will be omitted.

In step S1217, the JPEG-LS compression unit 105 transmits the generated JPEG-LS code to the code storing unit 106.

In step S1218, the JPEG-LS compression unit 105 transmits the size information of the JPEG-LS code to the control unit 107. The control unit 107 thus receives in step S920 illustrated in FIG. 9 as described above, the size information of the JPEG-LS code transmitted from the JPEG-LS compression unit 105.

FIGS. 13A, 13B, 13C, 13D, 13E, and 13F are flowcharts illustrating the processes performed by the code storing unit 106. The code storing unit 106 internally performs six processes in parallel. The processes are illustrated in FIGS. 13A, 13B, 13C, 13D, 13E, and 13F, respectively.

Figure 13A:
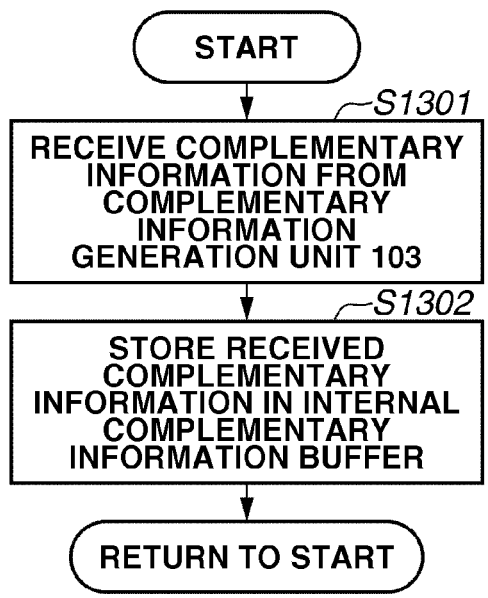

The process performed by the code storing unit 106 will be described below with reference to FIG. 13A.

In step S1301, if the code storing unit 106 receives the complementary information that the complementary information generation unit 103 has transmitted in step S1205 illustrated in FIG. 12A, the process proceeds to step S1302. The code storing unit 106 stands by in step S1301 until the complementary information is received.

In step S1302, the code storing unit 106 stores the received complementary information in an internal complementary information buffer. In such a case, the code storing unit 106 does not overwrite on the previously stored complementary information, and adds the complementary information so that the information can be read out in a stored order.

Figure 13B:
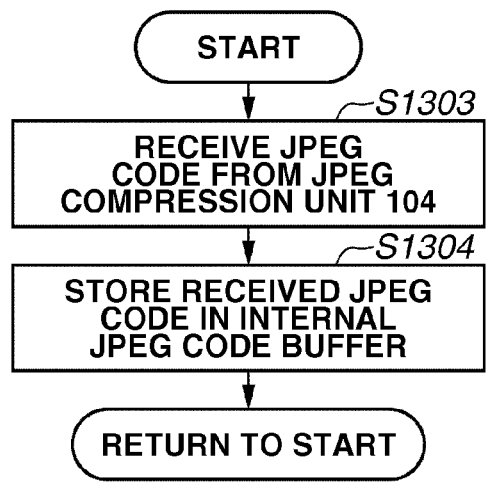

The process performed by the code storing unit 106 will be described below with reference to FIG. 13B.

In step S1303, if the code storing unit 106 receives the JPEG code that the JPEG compression unit 104 has transmitted in step S1211 illustrated in FIG. 12B, the process proceeds to step S1304. The code storing unit 106 stands by in step S1303 until the JPEG code is received.

In step S1304, the code storing unit 106 stores the received JPEG code in an internal JPEG code buffer.

Figure 13C:
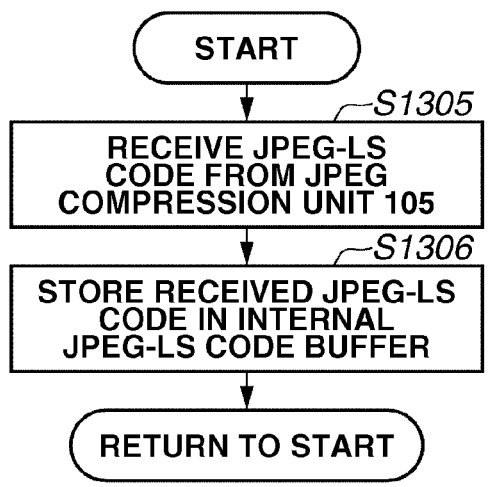

The process performed by the code storing unit 106 will be described below with reference to FIG. 13C.

In step S1305, if the code storing unit 106 receives the JPEG-LS code that the JPEG-LS compression unit 105 has transmitted in step S1217 illustrated in FIG. 12C, the process proceeds to step S1306. The code storing unit 106 stands by in step S1305 until the JPEG-LS code is received.

In step S1306, the code storing unit 106 stores the received JPEG-LS code in an internal JPEG-LS code buffer.

Figure 13D:
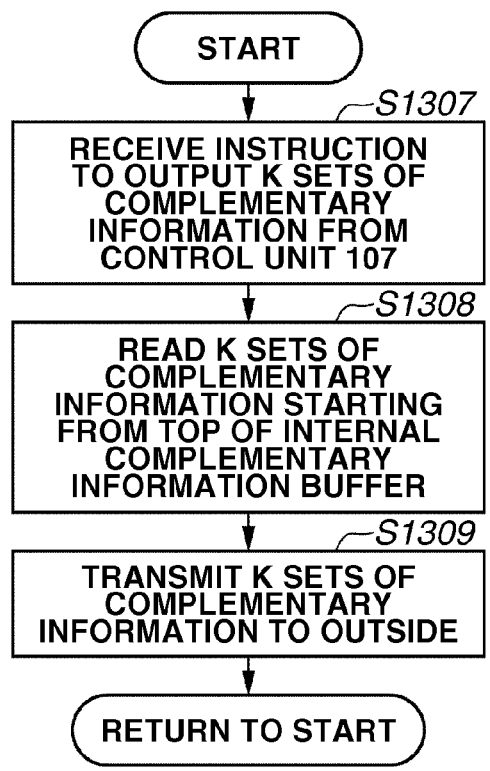

The process performed by the code storing unit 106 will be described below with reference to FIG. 13D.

In step S1307, if the code storing unit 106 receives an instruction to output K (i.e., M or N) sets of complementary information which the control unit 107 has transmitted thereto in step S923 or step S925 illustrated in FIG. 9, the process proceeds to step S1308. The code storing unit 106 stands by in step S1307 until the instruction is received.

In step S1308, the code storing unit 106 reads, starting from the top of the storing order, K sets of complementary information stored in the internal complementary information buffer.

In step S1309, the code storing unit 106 transmits the read complementary information to the outside.

The process performed by the code storing unit 106 will be described below with reference to FIG. 13E.

In step S1310, if the code storing unit 106 receives an instruction to output the JPEG code which the control unit 107 has transmitted thereto in step S924 illustrated in FIG. 9, the process proceeds to step S1311. The code storing unit 106 stands by in step S1310 until the instruction is received.

In step S1311, the code storing unit 106 reads the JPEG code stored in the internal JPEG code buffer.

In step S1312, the code storing unit 106 transmits the read JPEG code to the outside.

In step S1313, the code storing unit 106 clears the contents of the internal complementary information buffer, JPEG code buffer, and JPEG-LS code buffer.

The process performed by the code storing unit 106 will be described below with reference to FIG. 13F.

In step S1314, if the code storing unit 106 receives an instruction to output the JPEG-LS code which the control unit 107 has transmitted thereto in step S926 illustrated in FIG. 9, the process proceeds to step S1315. The code storing unit 106 stands by in step S1314 until the instruction is received.

In step S1315, the code storing unit 106 reads the JPEG-LS code stored in the internal JPEG-LS code buffer.

In step S1316, the code storing unit 106 transmits the read JPEG-LS code to the outside.

In step S1317, the code storing unit 106 clears the contents of the internal complementary information buffer, JPEG code buffer, and JPEG-LS code buffer.

The above-described series of processes performed by the image compression apparatus according to the present exemplary embodiment to compress the image data will be described below using as an example the image data of 2400 dpi illustrated in FIG. 2A.

The control unit 107 transmits to the image storing unit 101 the image data receiving signal. The image storing unit 101 then receives from the outside and internally stores the image data illustrated in FIG. 2A, and transmits to the control unit 107 the resolution information of the image data, i.e., 2400.

The control unit 107 causes the resolution conversion unit 102 to perform resolution conversion so that the resolution becomes 1200. At the same time, the control unit 107 causes the complementary information generation unit 103 to generate the complementary information for the image data of each resolution. In other words, since the initial resolution of the image illustrated in FIG. 2A is 2400, the control unit 107 generates the complementary information for the image data on which resolution conversion is performed at a reduction rate (i.e., 2400 dpi). The control unit further generates the complementary information for the image data on which resolution conversion is performed at a reduction rate 1 (i.e., 1200 dpi).

If the reduction rate is 0, the complementary information generation unit 103 receives all of the pixels from the resolution conversation unit 102. If the reduction rate is 1, the complementary information generation unit 103 receives from the resolution conversation unit 102 every two pixels in the horizontal direction and in the vertical direction. The complementary information generation unit 103 then generates and stores in the code storing unit 106 the complementary information. The complementary information generation unit 103 transmits to the control unit 107 the size information of the complementary information for each resolution.

Further, if resolution conversion is performed at the reduction rate 1 (i.e., 1200 dpi), the control unit 107 causes the JPEG compression unit 104 to generate the JPEG code. The JPEG compression unit 104 then receives from the resolution conversion unit 102 every two pixels in the pixel data, similarly as in the case of the complementary information unit 103 when the reduction rate is 1. The JPEG compression unit 104 performs JPEG compression on the pixels to generate the JPEG code, stores the generated JPEG code in the code storing unit 106, and transmits the size information of the JPEG code to the control unit 107.

Furthermore, when resolution conversion is performed at reduction rate 1 (i.e., 1200 dpi), the control unit 107 compares the size information of the complementary information with the size information of the JPEG code. If the size information of the complementary information is greater than or equal to the size information of the JPEG code, the control unit 107 does not perform JPEG-LS compression. In such a case, the control unit 107 causes the code storing unit 106 to output the complementary information acquired when resolution conversion is performed at reduction rate 0 (i.e., 2400 dpi) and the JPEG code acquired when resolution conversion is performed at reduction rate 1 (1200 dpi).

Moreover, if the size information of the complementary information is smaller than the size information of the JPEG code, the control unit 107 performs resolution conversion at reduction rate 2 (i.e., 600 dpi), and causes the JPEG-LS compression unit 105 to generate the JPEG-LS code. Since the reduction rate is 2, the JPEG-LS compression unit 105 receives from the resolution conversion unit 102 every four pixels in the pixel data. The JPEG-LS compression unit 105 then generates and stores in the code storing unit 106 the JPEG-LS code, and transmits the size information of the JPEG-LS code to the control unit 107.

The control unit 107 uses the above-described results to compare the sum of the size information of the complementary information and the size information of the JPEG-LS code with the size information of the JPEG code for the image data on which resolution conversion is performed at reduction rate 1 (i.e., 1200 dpi). If the sum of the size information of the complementary information and the size information of the JPEG-LS code is greater than or equal to the size information of the JPEG code for the image data on which resolution conversion is performed at reduction rate 1 (i.e., 1200 dpi), the control unit 107 performs the following process. The control unit 107 causes the code storing unit 106 to output the complementary information of the image data on which resolution conversion is performed at reduction rate 0 (i.e., 2400 dpi) and the JPEG code of the image data of reduction rate 1 (i.e., 1200 dpi).

On the other hand, if the size information of the JPEG code is greater than the sum of the size information of the complementary information and the size information of the JPEG-LS code, the control unit 107 performs the following process. The control unit 107 causes the code storing unit 106 to output the complementary information of the image data on which resolution conversion is performed at reduction rate 0 (i.e., 2400 dpi), the complementary information of the image data of reduction rate 1 (i.e., 1200 dpi), and the JPEG-LS code of the image data of reduction rate 2 (i.e., 600 dpi).

As described above, according to the present exemplary embodiment, the image compression apparatus 1 converts the high-resolution image data to a predetermined resolution (i.e., 1200 dpi or 600 dpi), and then performs JPEG compression or JPEG-LS compression. As a result, there is no variation in the level of image quality deterioration caused by performing image compression due to the difference in the resolutions of the original image.

Further, the image compression apparatus 1 does not perform complex image compression such as directly performing JPEG compression and JPEG-LS compression on the high-resolution image data. The circuit size of the image compression unit can thus be reduced.

If a plurality of low-resolution images is to be simply generated from the high-resolution image data, a plurality of pairs of the resolution conversion unit and the image storing unit which stores the resolution-converted image data may be serially-connected. The low-resolution images can then be sequentially generated. However, the circuit size increases in such a configuration.

For example, an image may be compressed at a uniform image resolution by serially connecting the units as described above. If high-resolution image data of 2400 dpi is to be processed using such a configuration, two resolution conversion units, three image storing units for storing the images before and after converting to each resolution, and two complementary information generation units become necessary.

Further, if image data of 4800 dpi is to be processed, three resolution conversion units, four image storing units, and three complementary information generation units become necessary, so that the circuit size is further increased.

In contrast, the image compression apparatus according to the present exemplary embodiment can process image data of various resolutions without increasing the number of each processing unit. As a result, the image compression apparatus according to the present exemplary embodiment is advantageous in terms of the circuit size and the flexibility in the image resolutions.

Figure 14:
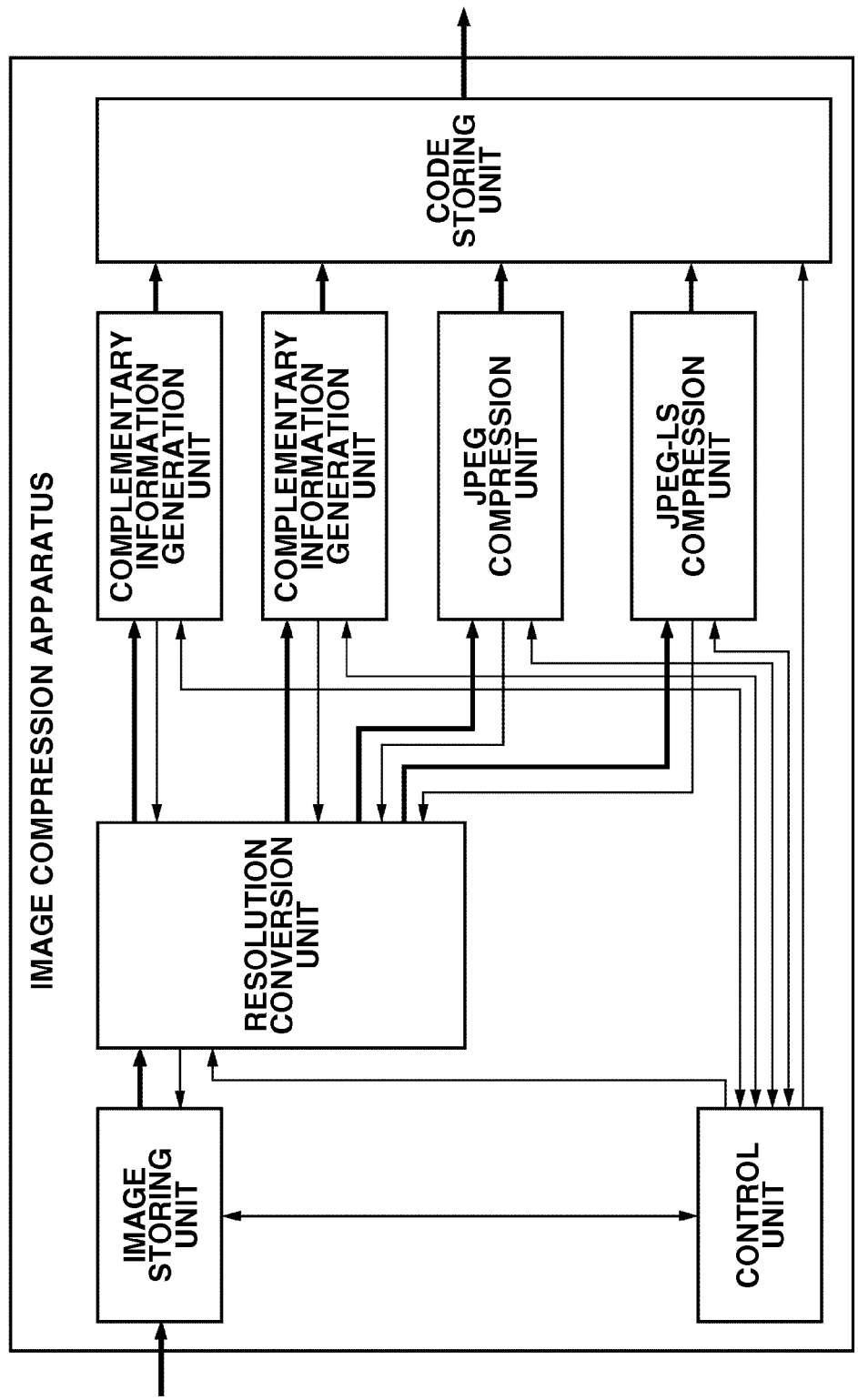
FIG. 14 is a block diagram illustrating an image compression apparatus according to a second exemplary embodiment.

FIG. 14 is a block diagram illustrating an image compression apparatus according to a second exemplary embodiment of the present invention. The image compression apparatus illustrated in FIG. 14 is different from the image compression apparatus illustrated in FIG. 1 in that there are two complementary information units instead of one.

The circuit size increases as a result of such a configuration. However, the complementary information of a plurality of resolutions can be generated at the same time by performing parallel processing, so that the speed of generating the complementary information can be increased. For example, the complementary information of an image of the resolution 2400 dpi and of an image of the resolution 1200 dpi can be generated at the same time.

As described above, the image compression apparatus according to the present exemplary embodiment can deal with various resolutions, and can also deal with the circuit size and processing speed performance demanded of the system by flexibly changing the configuration.

The third exemplary embodiment according to the present exemplary embodiment will be described below. The configuration of the image compression apparatus according to the present exemplary embodiment is different from the image compression apparatus according to the first exemplary embodiment in the method for generating the complementary information by the complementary information generation unit 103.

Figure 15:
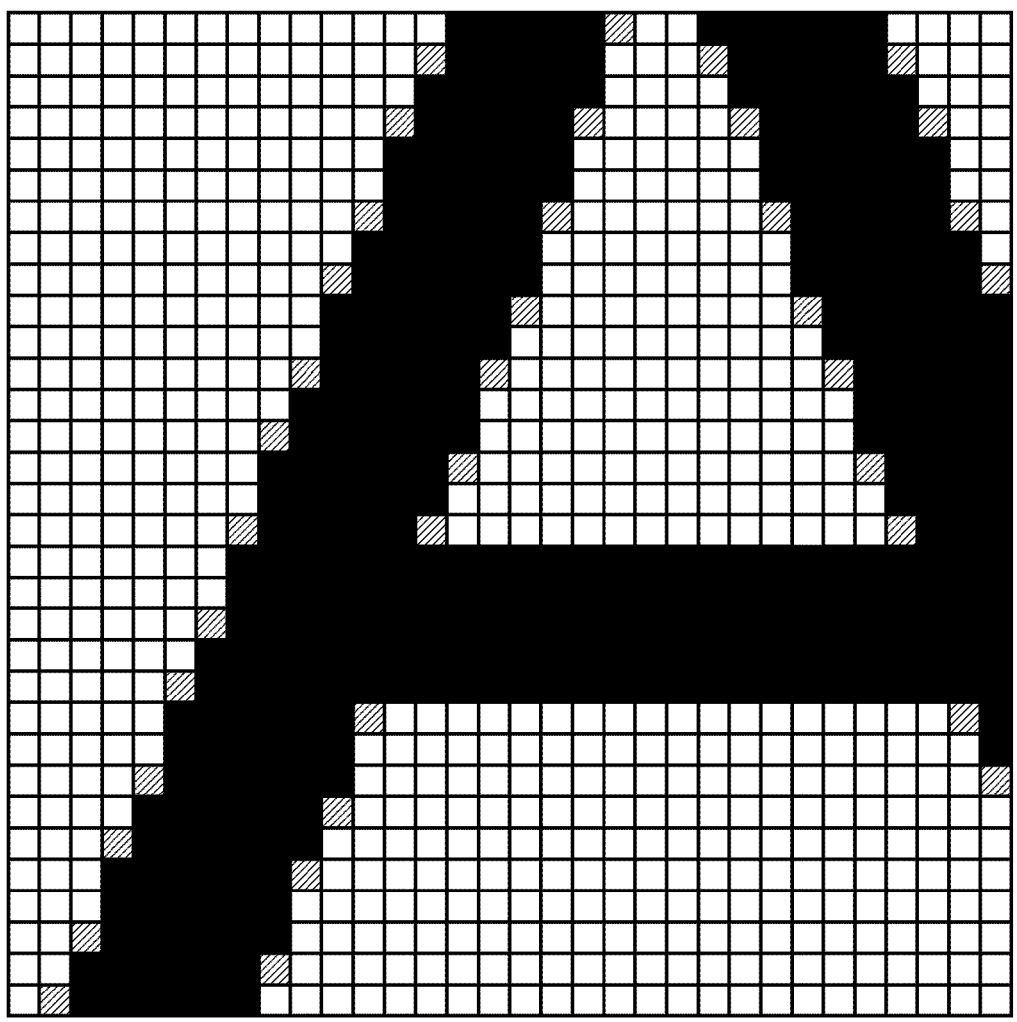
FIG. 15 is a schematic diagram illustrating image data of 32 pixels in the vertical direction and 32 pixels in the horizontal direction having a resolution of 2400 dpi.

FIG. 15 is a schematic diagram illustrating image data of 32 pixels in the vertical direction and 32 pixels in the horizontal direction having a resolution of 2400 dpi. Each cell indicates a pixel having 24-bit information. The value of the pixel is indicated by the white or black color, or by shading. The white pixel has a value of FFFFFFh, the black pixel a value of 000000h, and the shaded pixel a value of 808080h.

FIG. 16 is a schematic diagram illustrating the complementary information generated by the complementary information generation unit 103 based on an input of the image data illustrated in FIG. 15. The complementary information includes the pattern number and the pixel values of the number corresponding to the patterns (i.e., pixel values which are different from the pixel value of the reference pixel), similarly as in FIG. 7 described above. FIG. 16 only describes the pattern number among the complementary information.

The complementary information includes, for the patterns other than pattern 0, the pattern number and the values of the pixels that are different from the value of the reference lower-right pixel in the group. According to the first exemplary embodiment, the complementary information includes all pixel values that are different from the reference pixel value. According to the third exemplary embodiment, an average value of the pixel values that are different from the reference pixel value is calculated in the pattern in which there are two or more pixels of different values, and the average value is included as the complementary information.

As a result, the data amount can be reduced as compared to the first exemplary embodiment in which the pixel values of all different pixels are included in the group. However, since lossy conversion is performed, an approximation error occurs when restoring the original image data employing the complementary information, due to the average value.

Referring to FIG. 16, the positions of the 2 by 2 pixel blocks on which lossy conversion is performed are indicated by a bold frame. Such 2 by 2 pixel blocks are patterns in which there are two or more different pixel values, and the average value thereof becomes a different value.

As described above, the image compression apparatus according to the present exemplary embodiment can perform the process even when the information on which lossy compression is performed is included in the complementary information.

A fourth exemplary embodiment according to the present exemplary embodiment will be described below. The configuration of the image compression apparatus according to the present exemplary embodiment is different from the image compression apparatus according to the first exemplary embodiment in the process performed by the control unit 107.

Figure 17B:
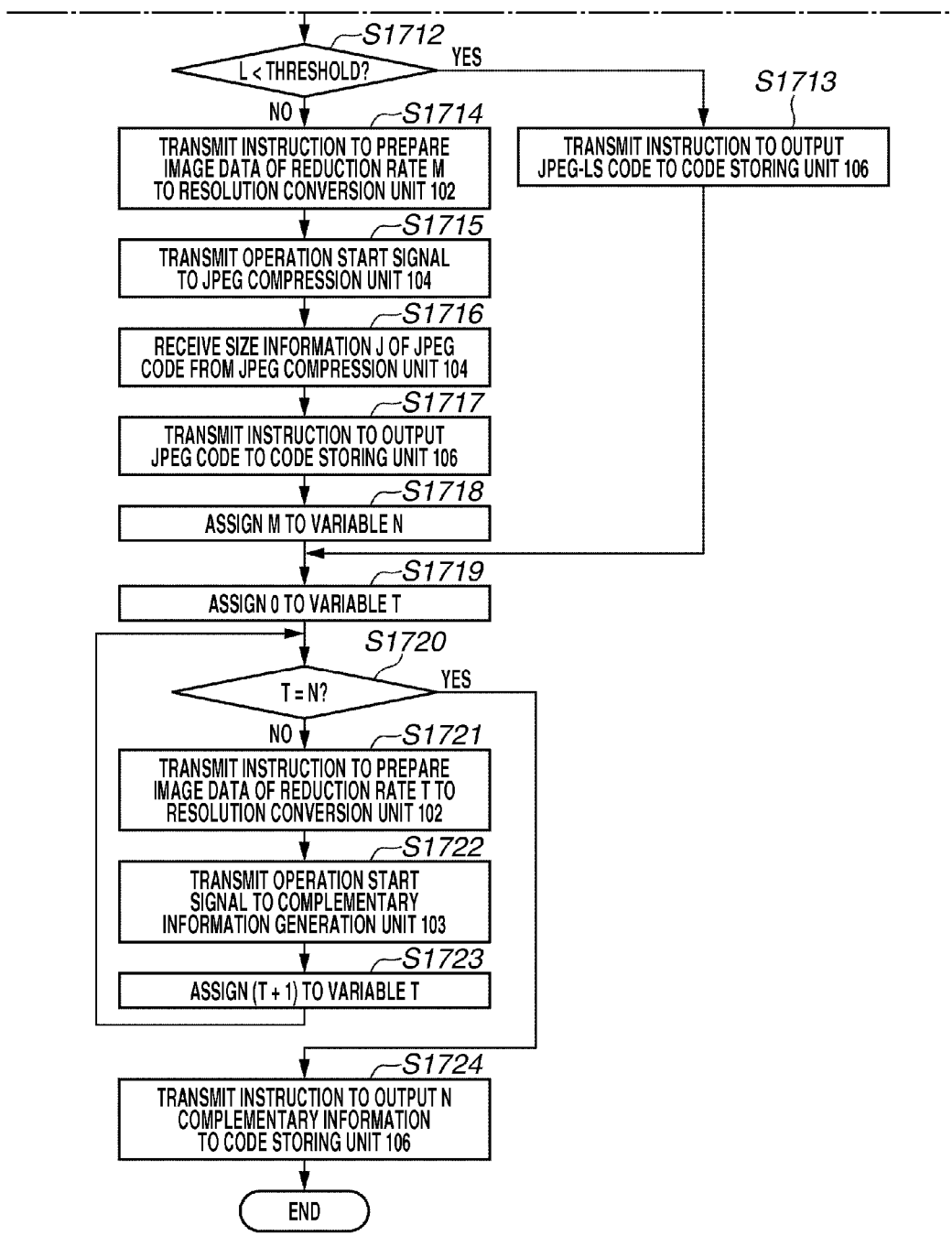
FIG. 17 (including 17A+17B) is a flowchart illustrating a process performed by the control unit 107 according to a fourth exemplary embodiment.

FIG. 17 (17A+17B) is a flowchart illustrating the process performed by the control unit 107. The processes performed in step S1701 to step S1708 are similar to those performed in step S901 to step S908 illustrated in FIG. 9. The processes which are different will be described below.

In step S1709, the control unit 107 transmits to the resolution conversion unit 102 the instruction to perform resolution conversion of the reduction rate N, and the number of pixels X and Y of the image data. The resolution conversion unit 102 thus receives from the control unit 107 in step S1101 illustrated in FIG. 11 the instruction to perform resolution conversion of the reduction rate N, and the number of pixels X and Y of the image data transmitted from the control unit 107.

In step S1710, the control unit 107 transmits the operation start signal to the JPEG-LS compression unit 105. The JPEG-LS compression unit 105 thus receives in step S1213 illustrated in FIG. 12C the operation start signal transmitted from the control unit 107.

In step S1711, the control unit 107 receives the size information of the JPEG-LS code transmitted from the JPEG-LS compression unit 105 in step S1218 illustrated in FIG. 12C, and assigns the received size information in a variable L.

In step S1712, the control unit 107 determines whether the value of the variable L is smaller than a predetermined threshold value. If the value of the variable L is smaller than the predetermined threshold value (YES in step S1712), the process proceeds to step S1713. In other words, the control unit 107 compares the size of the JPEG-LS code with the predetermined threshold value. If the size of the JPEG-LS code is smaller than the predetermined threshold value, the control unit 107 selects outputting by performing the JPEG-LS compression method and does not perform JPEG compression. Such a conditional branching is thus performed.

On the other hand, if the value of the variable L is not smaller than the predetermined threshold value (NO in step S1712), the process proceeds to step S1714. More specifically, the conditional branching is performed in which, if the size of the JPEG-LS code is greater than or equal to the predetermined threshold value, the JPEG compression process is performed and the result is output. In such a case, the complementary information is not generated for image data of reduction rate M to reduction rate (N−1).

In step S1713, the control unit 107 transmits to the code storing unit 106 the instruction to output the JPEG-LS code. The process then proceeds to step S1719. The code storing unit 106 thus receives from the control unit 107 in step S1314 illustrated in FIG. 13F, the instruction to output the JPEG-LS code.

In step S1714, the control unit 107 transmits to the resolution conversion unit 102 the instruction to perform resolution conversion of the reduction rate M, and the numbers of pixels X and Y of the image data. The resolution conversion unit 102 thus receives the instruction to perform resolution conversion of the reduction rate M, and the numbers of pixels X and Y of the image data transmitted from the control unit 107 in step S1101 illustrated in FIG. 11.

In step S1715, the control unit 107 transmits the operation start signal to the JPEG compression unit 104. The JPEG compression unit 104 thus receives in step S1207 illustrated in FIG. 12B the operation start signal transmitted from the control unit 107.

In step S1716, the control unit 107 receives and assigns to the variable J the size information of the JPEG code transmitted from the JPEG compression unit 104 in step S1212 illustrated in FIG. 12B. In other words, the process is performed to detect the completion of the image compression process by the JPEG compression unit 104.

In step S1717, the control unit 107 transmits to the code storing unit 106 an instruction to output the JPEG code. The code storing unit 106 thus receives from the control unit 107 in step S1310 illustrated in FIG. 13E the instruction to output the JPEG code.

In step S1719, the control unit 107 assigns 0 to the variable T. The variable T is a variable indicating the reduction rate.

In step S1720, the control unit 107 determines whether the value of the variable T is equal to the value of the variable N. If the value of the variable T is equal to the value of the variable N (YES in step S1720), the process proceeds to step S1724. If the value of the variable T is not equal to the value of the variable N (NO in step S1720), the process proceeds to step S1721.

In step S1721, the control unit 107 transmits to the resolution conversion unit 102 the instruction to perform resolution conversion of the reduction rate T, and the number of pixels X and Y of the image data. The resolution conversion unit 102 thus receives from the control unit 107 in step S1101 illustrated in FIG. 11A the instruction to perform resolution conversion of the reduction rate T, and the number of pixels X and Y of the image data transmitted from the control unit 107.

In step S1722, the control unit 107 transmits the operation start signal to the complementary information generation unit 103. The complementary information generation unit 103 thus receives in step S1201 illustrated in FIG. 12A the operation start signal transmitted from the control unit 107.

In step S1723, the control unit 107 assigns (T+1) to the variable T, and the process then returns to step S1720.

In step S1724, the control unit 107 transmits to the code storing unit 106 an instruction to output N sets of complementary information. The code storing unit 106 thus receives from the control unit 107 in step S1307 illustrated in FIG. 13D the instruction to output N sets of complementary information.

As described above with reference to FIG. 17, the image compression apparatus according to the fourth exemplary embodiment determines whether the size of the JPEG-LS code is smaller than the predetermined threshold value. The image compression apparatus can then control whether to generate the JPEG code and the complementary information based on the determination result.

According to the first exemplary embodiment, the arrangement patterns are defined as illustrated in FIG. 6, and the complementary information includes the pattern number and the pixel values of all pixels each having a different pixel value from the reference pixel. According to the first exemplary embodiment, there are eight arrangement patterns, so that the pattern number can be expressed in 3-bit with respect to each 2 by 2 pixel block.

Further, when each pixel is expressed by a 24-bit color, there may be no pixel or one, two, or three pixels (i.e., zero for pattern number 0, and three for pattern number 7) each having a different pixel value from that of the reference pixel (i.e., complementary color). The size of the pixel value stored as the complementary information thus becomes 0 to 72 bits. Since there is always one reference pixel, the size of the reference pixel is expressed in 24 bits.

Figure 18:
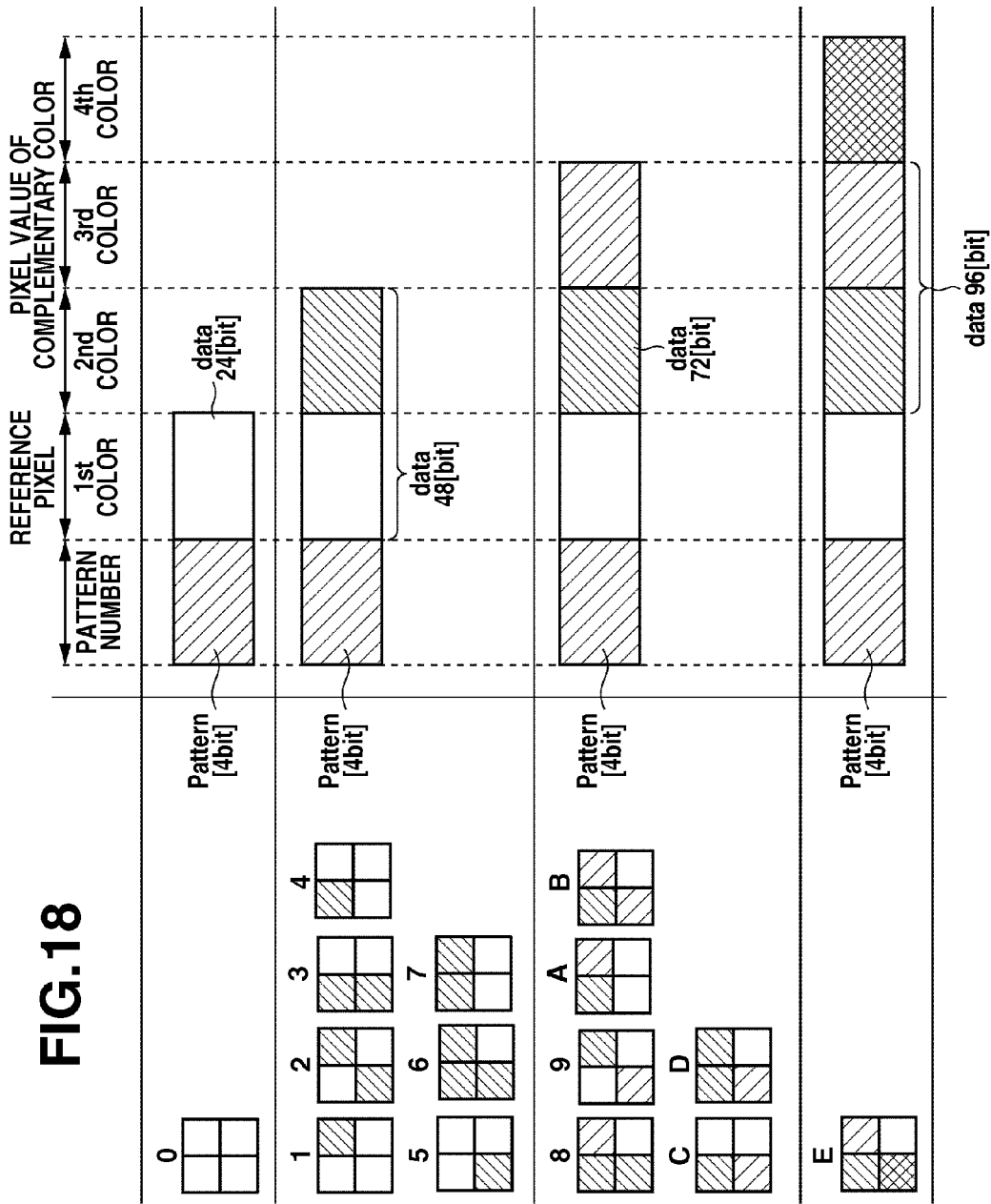
FIG. 18 is a list of arrangement patterns used to generate complementary information according to the fifth exemplary embodiment.

According to the fifth exemplary embodiment, the complementary information is generated using a method different from the method using the arrangement pattern illustrated in FIG. 6 according to the first exemplary embodiment. FIG. 18 illustrates the arrangement patterns used in generating the complementary information according to the fifth exemplary embodiment. According to the fifth exemplary embodiment, the pixels at different positions from the reference pixel (i.e., the lower-right pixel) are also compared, so that the pixel values are held for each pixel determined to be of the same color (i.e., same pixel value).

When the entire 2 by 2 pixel block is of the same color, the pattern number becomes 0. When there are two colors in the 2 by 2 pixel block, the pattern numbers become 1, 2, 3, 4, 5, 6, or 7. When there are three colors, the pattern numbers become 8, 9, A, B, C, and D. When there are four colors, the pattern number becomes E. In other words, there are 15 arrangement patterns of the colors with respect to the 2 by 2 pixel block, so that the pattern number for each 2 by 2 pixel block can be expressed in 4 bits.

Further, the pixel value of the reference pixel with respect to each 2 by 2 pixel block can be expressed in 24 bits. Furthermore, since there is no complementary color (i.e., pixel value different from the reference pixel), or one, two, or three complementary colors with respect to each 2 by 2 pixel block, the complementary colors can be expressed in 0 to 72 bits. In other words, the arrangement pattern illustrated in FIG. 18 indicates the number of colors included in the 2 by 2 pixel block (i.e., the number of types of the pixel values) and the arrangement of each color.

In such a case, the complementary information generation unit 103 divides the input data into 2 by 2 pixel blocks, and the pattern illustrated in FIG. 18 matching each 2 by 2 pixel block is determined. As a result, the complementary information is output including the pattern number and the complementary color (i.e., the pixel value different form the color of the reference pixel) according to the number of colors corresponding to each arrangement pattern.

According to the above-described first, second, third, fourth, and fifth exemplary embodiments, the lower-right pixel in the 2 by 2 pixel block is designated as the reference pixel when generating the complementary information. However, this is not a limitation, and the pixels in other positions (e.g., upper-left pixel) may be set as the reference pixel when assigning the pattern.

According to the first exemplary embodiment, the compressed data output from the code storing unit 106 in the final process is determined based on the data sizes of the complementary information, the JPEG code, and the JPEG-LS code.

According to a seventh exemplary embodiment, a user previously designates outputting either the JPEG code or the JPEG-LS code. In such a case, one of the JPEG compression unit 104 or the JPEG-LS compression unit 105 in the image compression apparatus 1 illustrated in FIG. 1 that has been designated by the user functions as the compression unit.

For example, if the user designates JPEG compression as the compression method, the resolution conversion unit 102 generates the image of each resolution acquired by performing resolution conversion of reduction rate T (T=0, 1, . . . , M−1). The complementary information generation unit 103 then generates the complementary information for the image of each resolution. The code storing unit outputs the generated complementary information and the image data acquired by performing JPEG compression using the compression unit on the image of resolution acquired by performing resolution conversion of reduction rate M.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-256308 filed Nov. 16, 2010, which is hereby incorporated by reference herein in its entirety.

What is claimed is:

1. An image compression apparatus comprising:
an image storing unit configured to store first image data;
a conversion unit configured to acquire, from the image storing unit, pixel data thinned out to be of a second resolution which is $1/(2^T)$ times a first resolution of the first image data (T=0, 1, 2, . . . N), and output the acquired pixel data as second image data;
a generation unit configured to divide the second image data into blocks of 2 by 2 pixels, and generate complementary information based on an arrangement pattern of pixel values in each of the divided blocks, wherein the complementary information enables restoration of the second image data by combining the complementary information with a third image whose third resolution is ½ times the second resolution of the second image data, and wherein the generation unit generates the complementary information with respect to each of the second image data whose second resolutions are $1/(2^T)$ times the first resolution (T=0, 1, 2, . . . , N−1);
a first compression unit configured to generate first compressed data by compressing, employing a first compression method, the second image data whose resolution is $1/(2^M)$ times the first resolution (M<N);
a second compression unit configured to generate second compressed data by compressing, employing a second compression method, the second image data whose resolution is $1/(2^N)$ times the first resolution;
a code storing unit configured to store the generated complementary information, the first compressed data, and the second compressed data; and
a control unit configured to determine whether to cause the code storing unit to output a combination of the first compressed data and the complementary information generated with respect to each of the second image data whose second resolutions are $1/(2^T)$ times the first resolution (T=0, 1, 2, ..., M−1), or output a combination of the second compressed data and the complementary information generated with respect to each of the second image data whose second resolutions are 1/(2^T) times the first resolution (T=0, 1, 2, ..., N−1), based on at least one of a data size of the complementary information for each resolution, a data size of the first compressed data, and a data size of the second compressed data, and to control the code storing unit to output the combination determined to be output.

2. The image compression apparatus according to claim 1, wherein the control unit performs control to cause the code storing unit to output, if a sum of a data size of complementary information generated with respect to each of the second image data of 1/(2^T) times the first resolution (T=M, M+1, ..., N−1) and a data size of the second compressed data is greater than or equal to the first compressed data, a combination of the first compressed data and the complementary information generated with respect to each of the second image data of 1/(2^T) times the first resolution (T=0, 1, 2, ..., M−1), and to output, if the sum is smaller than the data size of the first compressed data, a combination of the second compressed data and the complementary information generated with respect to each of the second image data of 1/(2^T) times the first resolution (T=0, 1, 2, ..., N−1).

3. The image compression apparatus according to claim 1, wherein the control unit performs control to cause the code storing unit to output, if a data size of complementary information generated by the generation unit with respect to the second image data including pixel data thinned out to become 1/(2^M) times the first resolution is determined to be greater than or equal to the data size of the first compressed data generated by the first compression unit, the combination of the first compressed data and the complementary information generated with respect to each of the second image data of 1/(2^T) times the first resolution (T=0, 1, 2, ..., M−1), without causing the second compression unit to generate the second compressed data.

4. The image compression apparatus according to claim 1, further comprising a plurality of the generation units,
wherein each of the plurality of the generation units is caused to generate complementary information with respect to image data of different resolutions.

5. The image compression apparatus according to claim 1, wherein the generation unit generates as the complementary information, an arrangement pattern of pixel values in the 2 by 2 pixel block, and pixel values which are different from a pixel value of a reference pixel in the 2 by 2 pixel block.

6. The image compression apparatus according claim 5, wherein the arrangement pattern and the pixel values are separately output.

7. The image compression apparatus according claim 5, wherein the arrangement pattern indicates a number of colors and an arrangement of each color in the 2 by 2 pixel block, and the pixel values are output according to the number of colors.

8. The image compression apparatus according to claim 1, wherein the control unit performs control to cause the code storing unit to output, if a data size of the second compressed data is smaller than a predetermined threshold value, the combination of the second compressed data and the complementary information generated with respect to the second image data of 1/(2^T) times the first resolution (T=0, 1, 2, ..., N−1), and to output, if a data size of the second compressed data is not smaller than a predetermined threshold value, the combination of the first compressed data and the complementary information generated with respect to the second image data of 1/(2^T) times the first resolution (T=0, 1, 2, ..., M−1).

9. The image compression apparatus according to claim 1, wherein the first compression method performs lossy compression and the second compression method performs lossless compression.

10. The image compression apparatus according to claim 1, wherein the variables M and N are set based on the first resolution of the first image data.

11. An image compression method performed by an image compression apparatus including an image storing unit configured to store first image data, a conversion unit, a generation unit, a first compression unit, a second compression unit, a code storing unit configured to store complementary information generated by the generation unit, first compressed data generated by the first compression unit, and second compressed data generated by the second compression unit, and a control unit, the method comprising:

Acquiring from the image storing unit, pixel data thinned out to be of a second resolution which is 1/(2^T) times a first resolution of the first image data (T=0, 1, 2, ... N), and outputting the acquired pixel data as second image data;

dividing, using the generation unit, the second image data into blocks of 2 by 2 pixels, and generating complementary information based on an arrangement pattern of pixel values in each of the divided blocks, wherein the complementary information enables restoration of the second image data by combining the complementary information with a third image whose third resolution is ½ times the second resolution of the second image data, wherein the complementary information is generated with respect to each of the second image data whose second resolutions are 1/(2^T) times the first resolution (T=0, 1, 2, ..., N−1);

generating, using the first compression unit, the first compressed data by compressing employing a first compression method, the second image data whose resolution is 1/(2^M) times the first resolution (M<N);

generating, using the second compression unit, second compressed data by compressing employing a second compression method, the second image data whose resolution is 1/(2^N) times the first resolution;

storing, using the code storing unit, the generated complementary data, the generated first compressed data, and the generated second compressed data; and determining, using the control unit, whether to cause the code storing unit to output a combination of the first compressed data and the complementary information generated with respect to each of the second image data whose second resolution are 1/(2^T) times the first resolution (T=0, 1, 2, ..., M−1), or output a combination of the second compressed data and the complementary information generated with respect to each of the second image data of 1/(2^T) times the resolution (T=0, 1, 2, ..., N−1), based on at least one of a data size of the complementary information for each resolution, a data size of the first compressed data, and a data size of the second compressed data, and controlling the code storing unit to output the combination determined to be output.

12. A non-transitory computer-readable storage medium storing a program which causes a computer to function as an image compressing apparatus comprising:

a conversion unit configured to acquire, from an image storing unit, pixel data thinned out to be of a second resolution which is 1/(2^T) times a first resolution of the first image data (T=0, 1, 2, ... N), and output the acquired pixel data as second image data;

a generation unit configured to divide the second image data into blocks of 2 by 2 pixels, and generate complementary information based on an arrangement pattern of pixel values in each of the divided blocks, and store the generated complementary information in a code storing unit, wherein the complementary information enables restoration of the second image data by combining the complementary information with a third image whose third resolution is ½ times the second resolution of the second image data, and wherein the generation unit generates the complementary information with respect to each of the second image data whose second resolutions are $1/(2^T)$ times the first resolution (T=0, 1, 2, ..., N−1);

a first compression unit configured to generate first compressed data by compressing, employing a first compression method, the second image data whose resolution is $1/(2^M)$ times the first resolution (M<N), and store the generated first compressed data in the code storing unit;

a second compression unit configured to generate second compressed data by compressing, employing a second compression method, the second image data whose resolution is $1/(2^N)$ times the first resolution, and store the generated second compressed data in the code storing unit; and a control unit configured to determine whether to cause the code storing unit to output a combination of the first compressed data and the complementary information generated with respect to each of the second image data whose second resolutions are $1/(2^T)$ times the first resolution (T=0, 1, 2, ..., M−1), or output a combination of the second compressed data and the complementary information generated with respect to each of the second image data whose second resolutions are $1/(2^T)$ times the first resolution (T=0, 1, 2, ..., N−1), based on at least one of a data size of the complementary information for each resolution, a data size of the first compressed data, and a data size of the second compressed data, and to control the code storing unit to output the combination determined to be output.

* * * * *